United States Patent
Sabbavarapu et al.

(10) Patent No.: US 9,411,809 B1
(45) Date of Patent: Aug. 9, 2016

(54) REMOTE CONTENT PRESENTATION QUEUES

(71) Applicant: Amazon Technologies, Inc., Reno, NV (US)

(72) Inventors: Mahesh Babu Sabbavarapu, Seattle, WA (US); Ruijie Fu, Seattle, WA (US); Brian Alexander Kroeker, Kirkland, WA (US); Vijay Gangadaran, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 193 days.

(21) Appl. No.: 14/201,280

(22) Filed: Mar. 7, 2014

(51) Int. Cl.
*G06F 17/30* (2006.01)

(52) U.S. Cl.
CPC .............................. *G06F 17/30053* (2013.01)

(58) Field of Classification Search
USPC ................................................. 707/705, 799
See application file for complete search history.

(56) References Cited

U.S. PATENT DOCUMENTS

| | | | | |
|---|---|---|---|---|
| 5,872,747 A * | 2/1999 | Johnson | ............... | G11B 17/228 369/30.08 |
| 6,332,175 B1 * | 12/2001 | Birrell | .............. | G11B 20/10527 369/30.23 |
| 6,928,433 B2 * | 8/2005 | Goodman | ............. | G06F 3/0482 386/243 |
| 7,551,647 B2 * | 6/2009 | Fellman | ................ | H04J 3/0638 370/503 |
| 8,060,463 B1 * | 11/2011 | Spiegel | ................... | G06Q 30/02 707/609 |
| 8,396,951 B2 * | 3/2013 | Svendsen | ............... | H04H 20/82 706/16 |
| 8,510,847 B2 * | 8/2013 | Knight | ................... | G06Q 10/10 455/3.03 |
| 8,544,046 B2 * | 9/2013 | Gran | ................. | G06F 17/30038 709/216 |
| 2010/0095332 A1 * | 4/2010 | Gran | ................. | G06F 17/30038 725/93 |

* cited by examiner

*Primary Examiner* — Kim Nguyen
(74) *Attorney, Agent, or Firm* — Sutherland Asbill & Brennan LLP

(57) ABSTRACT

Systems, methods, and computer-readable media are disclosed for generating, storing, and managing play queues remotely from a user device on which content associated with the play queues may be played. A client application executing on a user device may transmit a request to generate a remote play queue to a remote server. The request may include an indication one or more sources for the content and may optionally include an indication of the content to associate with the play queue. The remote server may access metadata associated with a subset of the content of the play queue and transmit the metadata to the client application, thereby allowing retrieval and playback of the content on the user device.

25 Claims, 8 Drawing Sheets

REMOTE CONTENT PRESENTATION QUEUES

BACKGROUND

A number of content presentation applications, such as media player applications, are available for organizing, managing, and presenting a variety of types of content to a user such as audio content, video content, multimedia content, or the like. The content may be stored locally on a user device on which the content presentation application executes or may be streamed or downloaded to the user device from a remote location and presented using the content presentation application. The content may be predetermined content such as a collection of songs in a user's content library or may be identified based on attributes associated with a user or a user device such as user preferences, geographical location of a user device, or the like. A content presentation application may also provide a user with a capability to generate playlists that specify an order in which content is to be presented such as, for example, an order in which song tracks are to be played.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
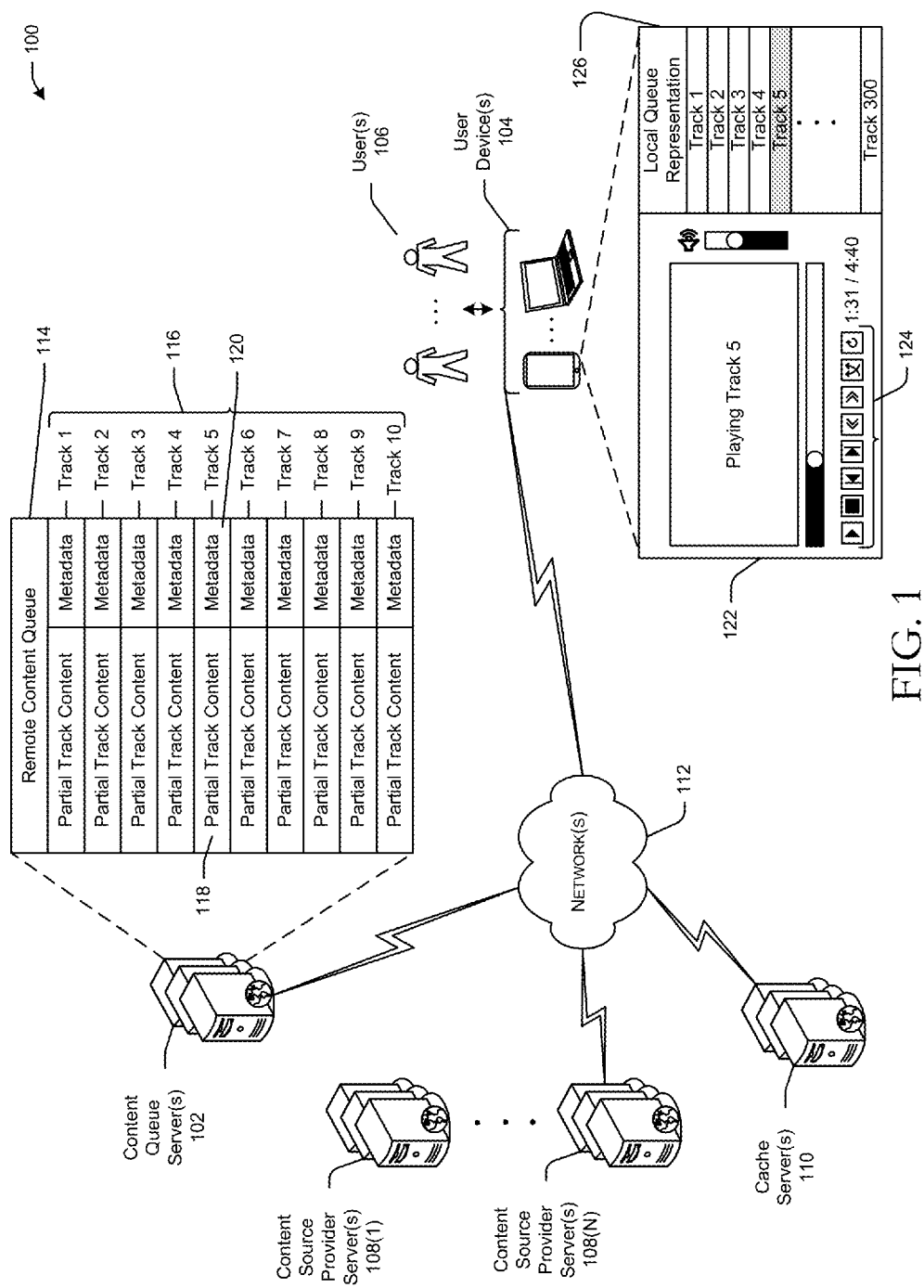
FIG. 1 is a schematic diagram depicting an illustrative system architecture for generating and managing content presentation queues remotely from a user device on which content associated with the queues may be presented in accordance with one or more example embodiments of the disclosure.

This disclosure relates to, among other things, systems, methods, computer-readable media, techniques, and methodologies for generating and managing remote content presentation queues and facilitating presentation of content associated with the queues on user devices.

As used herein, the term "remote content presentation queue" may refer to a collection of data that: 1) may be indicative of one or more attributes of one or more content elements, 2) may specify a static ordering indicative of an order in which the content elements are to be presented via a content presentation application, and 3) may be stored and managed at one or more locations that are remote from a device on which content associated with the queue may be presented. The terms "remote content queue," "remote play queue," or variants thereof, may at times be used herein interchangeably with the term "remote content presentation queue." Although a remote content presentation queue may be associated with a static ordering, content associated with the queue may be presented in accordance with a dynamic re-ordering of the queue (e.g., a shuffle) while still maintaining the static ordering for subsequent content presentations. Further, while example embodiments of the disclosure may be described herein in the context of remote content queues for audio file tracks, it should be appreciated that the disclosure is applicable to any type of content for which a remote content queue may be generated.

Conventionally, play queues such as song playlists are stored locally on a user device capable of presenting the associated content, regardless of whether the content is stored on the user device or sourced or streamed from a remote location. As such, while conventional play queues may be maintained across device re-boots such that the order in which the associated content is to be presented remains unchanged, the state of the play queue prior to a device re-boot is not maintained. For example, if a conventional play queue is at a particular position (e.g., track 54 of 300 tracks) prior to a device re-boot, that play queue position is not maintained subsequent to re-boot. Rather, the play queue will begin at an initial position (e.g., track 1) or, if a shuffle mode is selected, playback of a randomly selected track will begin.

It should be appreciated that content provided by, for example, online music streaming providers based on user preferences, user or user device characteristics, or the like may not be presented in accordance with a queue, as that term is used herein. More specifically, such attribute-based content presentations may not be associated with a static ordering that is repeatable. Further, such attribute-based content presentations are not capable of maintaining state across device re-boots. Moreover, even in those scenarios in which an online music streaming "station" may present a predetermined set of content (e.g., content associated with a particular genre) in accordance with a predetermined order, the state of the "station" on a particular user device is not maintained across device re-boots.

In addition, conventional play queues do not include the capability to source content from multiple content source providers. For example, while media player applications (e.g., desktop applications, mobile applications, etc.) that stream content from a remote source to a user device may provide the capability to generate play queues, such applications are typically dedicated applications that source content from only a particular content provider.

Another drawback of conventional media player applications is that they do not provide a capability to generate an aggregate play queue for playback of content associated with multiple users. While a user may be able to share content with another user such that the user receiving the content may generate his/her own playlist for the content (or modify an existing playlist to incorporate the received content), conventional media player applications do not provide a capability to generate an aggregate play queue with which multiple users can associate their respective content such that any particular user can access the content of another user through the aggregate play queue.

Remote content presentation queues in accordance with embodiments of the disclosure provide a number of technical effects that address, among other things, some or all of the drawbacks noted above in regards to conventional play queues. More specifically, technical effects provided by embodiments of the disclosure include, but are not limited to, the capability to maintain the state of a content presentation queue across device re-boots, the capability to source content associated with a content presentation queue from multiple content source providers, the capability to generate an aggregate content presentation queue with which multiple users can associate their respective content and which is shareable by multiple users of a device, the capability to minimize latency issues that may be caused by storing a content presentation queue remotely, and so forth. Aspects of the disclosure that yield the above-mentioned technical effects will be described in more detail later in this disclosure.

In an illustrative and non-limiting example embodiment of the disclosure, a user device such as a smartphone, tablet, or personal computer may be provided. A client application may be executable on the user device. The client application may be configured to present content to a user in accordance with a remote content presentation queue. For example, the client application may be media player application configured to pay media tracks in accordance with a remote play queue.

The client player application may be configured to transmit a request to a remote server to generate a remote play queue or associate content with an existing remote play queue. The user may be provided with a capability to specify the content (e.g., particular tracks) or the source of the content (e.g., a collection of tracks associated with the user's account at a content source provider) that he/she wishes to associate with the remote play queue. In certain example embodiments, the application may identify the content or the source of the content based on preselected or default application settings. In those example embodiments in which the user wishes to associate streamed content (e.g., streamed music) with the remote play queue, where the streamed music may not be predetermined, the user may specify the content source provider and the user's account information (e.g., log-in credentials) with the content source provider, or the application may automatically detect such information.

Upon receiving an indication of the content, detecting the content, or receiving or detecting the source of the content, the player application may transmit a remote play queue generation request to a remote server. The request may include the information received or detected by the application that identifies the content or the source of the content. The remote server may be configured to generate the play queue based at least in part on the information included in the request. More specifically, the remote server may transmit one or more requests to one or more content source providers for metadata associated with one or more tracks of the remote play queue. The requested metadata for a track may include an identifier associated with the track, one or more uniform resource locators (URLs) or other location identifiers that identify various resources storing the track content or other metadata associated with the track (e.g., album art), or information associated with any of a variety of other attributes of the track such as, for example, genre information, album/artist information, track duration information, and so forth. The received track metadata may be transmitted to the user device for use by the player application in accessing the associated track content.

In certain example embodiments, the remote server may transmit intermittent requests for track metadata, with each request relating to only a subset of the total set of tracks associated with the remote play queue. At the same time, however, a local representation of the remote play queue presented to the user via the player application may provide the user with the impression that the entire play queue is stored on the remote server notwithstanding that only a subset of the play queue (e.g., track metadata associated with only a subset of the total number of tracks of the play queue) may be stored at the remote server any given point in time. In this manner, network latency that would otherwise be associated with transmitting track metadata to the user device for all tracks in the play queue is significantly minimized.

Various other latency minimizing measures may be implemented in example embodiments of the disclosure. For example, upon receiving the metadata associated with a particular number of tracks, the remote server may proactively fetch initial partial track content from one or more content source providers. More specifically, the remote server may utilize a track identifier such as a URL included in the metadata for each track to request, receive, and store an initial portion of the track content for each track. Accordingly, upon receiving an indication that a particular track has been selected for playback (either automatically or by a user), or proactively in conjunction with the track metadata, the remote server may transmit the stored initial partial content of the track to the user device to avoid any disruption to the user experience that may be caused by network latency associated with receipt of the content by the user device from the content source provider or from a content delivery network (CDN) with which the content source provider is associated.

As an illustrative and non-limiting example, upon receipt of the remote play queue generation request, the remote server may proceed to generate the remote play queue. As part of generating the remote play queue, the remote server may request the metadata for only a subset (e.g., initial tracks 1-5) of the total tracks of the play queue. As previously noted, this track metadata may include, among other things, a track identifier and one or more URLs specifying one or more network resources storing the track content or other metadata associated with the track (e.g., album information, images/graphics, etc.). The track metadata for the subset of tracks may be requested from any number of content source providers. For example, a first content source provider may provide track metadata for one or more tracks while one or more additional content source providers may provide track metadata for one or more additional tracks. Accordingly, receipt of a single remote play queue generation request may cause the remote server to transmit multiple track metadata requests to multiple content source providers.

As will be described in more detail later in this disclosure, the track metadata may include multiple URLs associated with the track. A subset of URLs may each point to a respective resource storing streaming track content while another subset of URLs may each point to a respective resource storing other metadata associated with the track. Any particular URL that points to a resource storing track content may be associated with a different content quality, content streaming quality, file format, or the like. Accordingly, the player application executing on a user device may select a particular URL for retrieving the track content based, for example, on a connection speed, a desired content streaming quality, or the like. Further, any particular URL that points to a resource storing other track metadata (e.g., album information, images/graphics, etc.) may be associated with a particular image size, file format, or the like. Accordingly, the player application executing on a user device may select a particular URL for retrieving other track metadata (e.g., album art) based on a desired image size, file format, etc. for presenting the other track metadata on the user device. In addition, in certain example embodiments, a time-to-live (TTL) value or the like may be associated with any particular URL that specifies a time period during which the URL is active and may be used to retrieve associated content or other track metadata, and beyond which the URL expires. On the other hand, any particular URL may be a URL that does not expire.

The remote server may transmit the track metadata to the player application executing on the user device to allow the application to retrieve associated content or other track metadata from the content source provider or from a CDN as needed. The remote server may additionally request and receive initial partial content for one or more of tracks 1-5 and transmit the initial partial content to the player application. The initial partial content stored for a particular track may be of any suitable duration to minimize the impact of network latency associated with receipt of the complete track content by a user device from a content source provider or a CDN. In one or more example embodiments of the disclosure, the initial partial content may be anywhere from 5-15 seconds in duration. While the remote server may be described as requesting and receiving track metadata or initial partial track content from content source provider(s), it should be appreciated that the track metadata or the initial partial track content may alternatively be received from a CDN.

Upon generating the remote play queue (including fetching the track metadata and initial partial track content for an initial subset of tracks), the remote server may transmit the fetched track metadata and the initial partial track content to the player application with an instruction to initiate playback of an initial track. In response, the player application may begin playing the initial partial track content for track 1 of the remote play queue, for example. The player application may also utilize the track metadata for track 1 received from the remote server to request the track 1 content directly from the content source provider or from a CDN. For example, the player application may utilize the identifier associated with track 1 and one or more URLs associated with track 1 included in the track metadata received from the remote server to request and retrieve the track 1 content as well as other metadata associated with track 1. In certain example embodiments, a URL may point to a server hosted by a content source provider. The content source provider server may store the track 1 content or may redirect the request to a cache server forming part of a CDN from which the content may be sourced. In other example embodiments, a URL used to retrieve the track 1 content may point directly to a cache server from which the content may be sourced. In certain example embodiments, the entire track 1 content may be received from the content source provider or from a CDN, while in other example embodiments, only the remaining portion of the track 1 content may be received (e.g., that portion of the track 1 content that excludes the initial partial content). The player application may be configured to seamlessly integrate the track content received from the content source provider or from the CDN with the initial partial track content being presented so as not to produce a disruptive user experience.

In accordance with one or more example embodiments of the disclosure, various instances of the player application may be executable on different devices, and a user may be permitted to perform actions relating to a remote play queue from the different devices. For example, a user may utilize a first instance of the player application on a first user device (e.g., an in-vehicle infotainment (IVI) system, a desktop or laptop computer, a home stereo system, etc.) to add content (e.g., a set of tracks) to a remote play queue. The user may then utilize a second instance of the player application on a different user device (e.g., a smartphone) to play the content added using the first user device. In addition, the state of the remote play queue may be maintained across user devices. In an example scenario, the player application may be playing track 44 of a remote play queue on a first user device. A user may decide to cease using the first user device and may begin using a second different user device. The user may utilize a player application on the second user device to access the remote play queue, and the content associated with the remote play queue may begin playing at the point at which it ceased playing on the first user device. For example, the content may begin playing on the second user device at a particular point of track 44 where playback ceased on the first user device. In other example scenarios, the next track in the queue (e.g., track 45) may begin playing on the second user device or a randomly selected track (if a shuffle mode has been selected for the queue as discussed below). As such, the state of the remote play queue may be obtained across user devices or device re-boots.

As previously described, track metadata associated with a subset of tracks may be provided by the remote server to the user device prior to initiation of presentation of the tracks. It should be appreciated, however, that in various example embodiments, track metadata associated with a track may be proactively fetched by the remote server, but only provided to the user device upon receipt of state information from the player application indicating that the track has been selected for presentation, upon receipt of state information from the player application indicating that the track is the next track in the queue for presentation, or upon an independent determination by the remote server that the track has been selected for presentation or is the next track in the queue for presentation. Further, while the initial partial content associated with a subset of tracks has been described as being proactively provided to the user device, it should be noted that the remote server may rather provide the initial partial content to the user device on an as-needed basis as noted above with respect to the track metadata.

As previously noted, the remote server may maintain, at any given time, track metadata in the remote play queue for only a subset of the total number of tracks associated with the queue. Upon determining that the number of tracks which have not yet been presented on the user device and for which track metadata has already been fetched has reached or is below a threshold value, the remote server may proactively fetch metadata for an additional subset of tracks that are next in the queue for presentation. For example, if the remote server has previously fetched track metadata for tracks 1-5 of a queue, and determines that track 5 is the next track in the queue to be played (e.g., track 4 is currently playing), the remote server may request track metadata for tracks 6-10 from the appropriate content source provider(s) in order to minimize potential latency introduced by fetching track metadata on demand.

It should be appreciated that the threshold value may be determined according to any suitable algorithm. For example, rather than employing a threshold value indicative of a number of tracks next to be played in the queue, a threshold value indicative of an amount of remaining content play time may be used. For example, continuing with the illustrative example from above, the remote server may fetch track metadata for tracks 6-10 when a particular duration of track 4 has elapsed. That is, the remaining duration of track 4 and the duration of track 5 may cumulatively correspond to the threshold value. It should further be appreciated that the remote server may become aware of which track is currently playing and the current playback position based on: 1) state information that may be periodically pulled from the player application or pushed to the remote server, 2) an extrapolation performed by the remote server from previously received state information, or 3) any other suitable mechanism.

In certain example embodiments, the remote server may not fetch track metadata in accordance with the queue order. Rather, for example, the remote server may identify the subset of tracks for which to request track metadata based on state information received from the media player application.

In certain example embodiments, the state information may indicate that a user has selected a shuffle mode for the queue. In such embodiments, the remote server may randomly select a predetermined number of tracks and fetch metadata associated with the random selection of tracks. The remote server may then provide the track metadata and an indication of the shuffled queue order to the player application responsive to fetching the track metadata or on an as-needed basis as described above. As long as the shuffle mode remains selected, the remote server may randomly select an additional predetermined number of tracks and fetch associated track metadata in accordance with any of the threshold conditions described above. If the user disables the shuffle mode, the media player application may transmit state information to the remote server indicating that the shuffle mode is no longer selected, and the remote server may fetch track metadata associated with a subset of tracks that are next in the queue for presentation (e.g., a predetermined number of tracks following the last track that was played while in shuffle mode).

In other example embodiments, state information received from the player application may indicate that the user has browsed to a particular position in the queue. For example, the user may browse to tracks 200-210 using a local representation of the queue provided by the player application on the user device. Responsive to receiving such state information, the remote server may fetch metadata associated with tracks 200-210 and provide the track metadata to the media player application proactively or on an as-needed basis as described above.

In still other example embodiments, state information received from the player application may indicate any number of other state changes with respect to the play queue. For example, the state information may indicate that a user has selected a "next" or "previous" button provided via a user interface of the player application to advance to a next track in the queue or a previous track in the queue. As another non-limiting example, the state information may indicate that a "loop" mode has been selected according to which playback of the tracks of the queue are repeated in accordance with the queue order (e.g., playback of the first track in the queue begins subsequent to completion of playback of the last track in the queue). According to another non-limiting example, the state information may indicate that a "repeat" mode has been selected according to which playback of a particular track is repeated until the "repeat" mode is disabled. It should be appreciated that the above examples of state transitions that may be indicated by the state information are merely illustrative and not exhaustive.

In various example embodiments of the disclosure, the remote server may be configured to generate an aggregate content presentation queue with which multiple users may associate their respective content and which may be accessible by each such user. The users may be a group of users sharing one or more common attributes such as a household, a group of friends, or the like. In certain example embodiments, multiple users may utilize a same user device, and in such embodiments, the remote server may create and maintain a single aggregate play queue for the user device with which each user of the device can interact.

In certain example embodiments of the disclosure, the remote server may be configured to maintain multiple remote content presentation queues for a particular user device. In certain scenarios, a single user may launch multiple instances of the player application on a user device (e.g., the player application may be a web-based application that is open in two different web browsers or two browser tabs). In other scenarios, multiple users may be using the same user device, and each user may have launched a separate instance of the player application. In such scenarios, a respective remote play queue may be generated and maintained for each instance of the player application until the remote server learns which instance of the player application actually initiated content presentation. Upon receiving state information from a particular instance of the player application that indicates that playback of a track has been initiated for that instance, the remote server may maintain the play queue corresponding to that instance of the player application and delete or otherwise disable the other play queues.

The remote server may also be configured to maintain multiple play queues in other scenarios as well. For example, the remote server may generate a first remote play queue in response to a first remote play queue generation request received from the player application. The remote server may transmit a first message to the player application that includes track metadata associated with the first remote play queue and an instruction to initiate presentation of content in accordance with the first remote play queue. The remote server may subsequently receive a second remote play queue generation request from the player application and may generate a second remote play queue in response to this second request. The remote server may transmit a second message to the player application that includes track metadata associated with the second remote play queue and an instruction to initiate presentation of content in accordance with the second remote play queue. However, in certain example embodiments, this second message may not be received by the player application due to loss of network connectivity for the user device. As such, the first remote play queue may be maintained by the remote server as being reflective of the actual state of the user device until state information is received from the player application indicating that the second message was received and presentation of content has been initiated in accordance with the second remote play queue, at which point, the second remote play queue may enabled and the first remote play queue may be deleted or otherwise disabled.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative System Architecture

FIG. 1 is a schematic diagram depicting an illustrative system architecture 100 for generating and managing content presentation queues remotely from a user device on which content associated with the queues may be presented in accordance with one or more example embodiments of the disclosure.

The illustrative architecture may include one or more content queue servers 102, one or more user devices 104 operable by one or more users 106, one or more content source provider servers 108(1)-108(N), and one or more cache servers 110. The content queue server(s) 102 may be configured to generate remote content presentation queues (hereinafter referred to interchangeably as "remote content queues," "content queues," or "remote play queues") based on requests received from instances of a companion client application 122 executing on the user device(s) 104. An illustrative remote content queue 114 is depicted in FIG. 1 and will be described in more detail hereinafter.

A respective one or more content source provider server(s) 108(1)-108(N) may be associated with each of one or more distinct content source providers. Each set of one or more content source provider servers (e.g., server(s) 108(1)) may store content associated with a particular content source provider. A content source provider server associated with any particular content source provider may be generically referred to herein as content source provider server 108. In certain example embodiments, at least a portion of the content stored on any particular content source provider server 108 (1)-108(N) may be cached on one or more cache servers 110 in order to minimize latency associated with delivering the content to the user device(s) 104. The cache server(s) 110 may be shared by multiple content source providers. In other example embodiments, one or more of the cache server(s) 110 may be dedicated servers that only cache content sourced by a particular content source provider. The cache server(s) 110 may form part of a CDN.

The content queue server(s) 102, the content source provider server(s) 108(1)-108(N), and the cache server(s) 110 may include any suitable computing device including, but not limited to, a server computer, a mainframe computer, a workstation, a desktop computer, a laptop computer, and so forth. The user device(s) 104 may include any suitable user device including, but not limited to, a smartphone or other cellular device, a tablet device, an electronic reader device, a desktop computing device, a laptop computing device, a gaming console, a multimedia content streaming device, a television such as Smart TV, or any other device capable of accessing, receiving, and/or displaying content received over one or more networks. While various illustrative components of the system architecture 100 may be described herein in the singular, it should be appreciated that multiple ones of any such components may be provided in various example embodiments of the disclosure.

Each of the content queue server 102, the user device 104, the content source provider server 108, and the cache server 110 may be configured to communicate with one or more other entities of the architecture 100 via one or more networks 112. The network(s) 112 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 112 may have any suitable communication range associated therewith and may include, for example, global networks (e.g., the Internet), metropolitan area networks (MANs), wide area networks (WANs), local area networks (LANs), or personal area networks (PANs). In addition, the network(s) 112 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The client application 122 is illustratively depicted in FIG. 1 as executing on an example user device 104. The client application 122 may be a player application that is configured to communicate with the content queue server 102 to present content to a user 106 in accordance with the remote content queue 114. As an illustrative example, the client application 122 may have transmitted a request to the content queue server 102 to generate the remote content queue 114. The request may have included information identifying the content or the source of the content to be associated with the remote queue 114.

As part of generating the remote queue 114, the content queue server 102 may have transmitted one or more requests to one or more content source provider servers 108 for metadata associated with a particular subset of tracks forming part of the remote content queue 114. For example, the content queue server 102 may have requested metadata associated with an initial set of tracks of the remote play queue (e.g., tracks 1-5). As previously described, the metadata received for a track (e.g., metadata 120 for track 5) may include an identifier associated with the track, one or more uniform resource locators (URL) or other location identifiers that identify one or more resources storing the track content or other metadata associated with the track, or information indicative of any of a variety of other attributes associated with the track such as, for example, genre information, album/artist information, track duration information, and so forth. As previously described, in one or more example embodiments of the disclosure, the track metadata may include multiple URLs that point to resources storing the track content and multiple URLs that point to resources storing other track metadata. Each such URL may be associated with a different content quality, streaming quality, file format, file size, image size, or the like. In addition, the content queue server 102 may have further requested initial partial content (e.g., partial track content 118) from the content source provider(s) for the tracks for which track metadata was received.

Upon generating the remote content queue 114 (including requesting and receiving track metadata and initial partial track content), the content queue server 102 may have generated and transmitted a message to the client application 122 to initiate content presentation in accordance with the queue 114. The message may have included the metadata for the initial subset of tracks (e.g., tracks 1-5) and the associated initial partial track content. Upon receipt of the message, the client application 122 may have initiated content presentation in accordance with the queue 114. For example, the client application 122 may have initiated playback of track 1 by playing the initial partial content of track 1 received from the remote server.

In addition, the client application 122 may have utilized the track identifier and the URLs included in the metadata associated with track 1 to request the track 1 content and other track metadata. In various example embodiments, the client application 122 may execute one or more algorithms to determine which URL to use to retrieve the track content and which URL to use to retrieve other track metadata (e.g., album images). Such algorithm(s) may utilize any number of factors such as, for example, network connectivity of the user device 104, network connection speed, type of user device 104, etc.

In certain example embodiments, the client application 122 may select a URL for retrieving the track content that points to a particular content source provider server 108, in which case, the content source provider server 108 may itself provide the track 1 content to the user device 104, or may redirect the client application 122 to a cache server 110 capable of providing the requested content. In other example embodiments, the selected URL may point directly to a cache server 110 capable of providing the content. Similarly, the client application 122 may select a URL for retrieving other track metadata that points to a particular content source provider server 108 (which may optionally be redirected to a cache server 110) or a URL that points directly to a cache server 110. As previously noted, the content received from content source provider server 108 or the cache server 110 may include the complete track 1 content or only a portion thereof (e.g., a portion excluding the initial partial content). While the track metadata and the initial partial content are described in connection with FIG. 1 as being provided to the client application 122 prior to initiation of content presentation, it should be appreciated, as previously described, that one or both of the track metadata and the initial partial content may be provided on an as-needed basis such as in response to state information received from the client application 122.

The client application 122 is illustratively shown in FIG. 1 in a state in which track 5 is being played. The client application 122 may have initiated presentation of track 5 in accordance with the ordering of the queue 114 (in which case track 4, and potentially one or more of tracks 1-3, may have played previously) or in response to a user selection of track 5 (in which case presentation of one or more of tracks 1-4 may have been skipped). The content queue server 102 may determine that track 5 is being played by the client application 122 based on state information received from the client application 122 that is indicative of a current state of the client application 122, by determining the queue position from state information that was previously received from the client application 122, or in accordance with any other suitable mechanism.

Upon determining that track 5 is being played by the client application 122, the content queue server 102 may determine that a threshold condition is met for requesting track metadata, and optionally initial partial track content, associated with an additional subset of tracks (e.g., tracks 6-10). As such, the content queue server 102 may request the track metadata and potentially the initial partial track content for tracks 6-10 from one or more content source provider servers 108. Accordingly, the remote content queue 114 is illustratively depicted as including initial partial track content and track metadata for the set 116 of tracks 1-10. As previously described, the threshold condition may correspond to any number of scenarios such as, for example, a scenario in which the number of tracks in the queue 114 that are yet to be presented and for which track metadata is stored meets or falls below a threshold value, a scenario in which an amount of track content that remains to be presented in accordance with the queue 114 and for which associated track metadata is stored meets or falls below a threshold value, or the like.

As depicted in FIG. 1, the client application 122 may present a local representation 126 of the remote content queue 114 to a user. The local representation 126 may provide an impression to the user that the entire queue is being stored remotely when in actuality metadata for only a subset of the tracks in the queue may be stored at any given point in time. If, for example, the user was to scroll through the local representation 126 of the queue to tracks 290-300, the client application 122 may communicate state information to the content queue server 102 indicating that the user is currently viewing tracks 290-300. In response, the content queue server 102 may request metadata, and optionally, initial partial content associated with tracks 290-300 and may provide the same to the client application 122. In this manner, the user experience is not disrupted because the user presumes that the entire queue is being stored remotely. In particular, if the user selects a track out of order in the queue, the client application 122 is able to present the initial partial content of the selected track, and thereby prevent any network latency associated with requesting and receiving the content of the selected track from disrupting the user experience.

The client application 122 may further include a number of control functions 124 that are selectable by a user, and that upon selection, may cause content presentation by the client application 122 to be altered in some manner. The controls 124 may include, for example, a shuffle button. Upon user selection of the shuffle button, the client application 122 may transmit state information to the content queue server 102 indicating the selection. In response, the content queue server 102 may randomly select a subset of tracks from the queue 114 without regards to the queue 114 order and request metadata, and optionally, partial track content associated with the random selection of tracks. The tracks may be randomly selected based on output generated by a random number generator or the like. Upon receipt of the track metadata, the content queue server 102 may transmit the metadata to the client application 122 along with an indication of the shuffled queue 114 order. The content queue server 102 may also transmit the initial partial track content to the client application 122 as well. The controls 124 may relate to any number of additional control functions such as "looping" through the queue 114, repeating a particular track of the queue 114, traversing through the queue 114 to a next or previous track, and so forth.

In certain example embodiments, the content queue server 102 may initially request a more expansive amount of respective metadata for each track in an initial subset of tracks (e.g., tracks 1-5) and a more limited amount of respective metadata (e.g., track ID and one or more URLs) for each track in a subsequent subset of tracks (e.g., tracks 6-10) in the queue 114. The content queue server 102 may then request additional respective metadata for each track in the subsequent subset of tracks (e.g., tracks 6-10) as the presentation of those tracks draws closer (e.g., in accordance with a threshold condition). In other example embodiments, the content queue server 102 may only request track metadata for the subset of initial tracks (e.g., tracks 1-5) and may request metadata for subsequent tracks (e.g., tracks 6-10) in the queue 114 at a later time such as, for example, in response to a threshold condition being met as described earlier.

Figure 2:
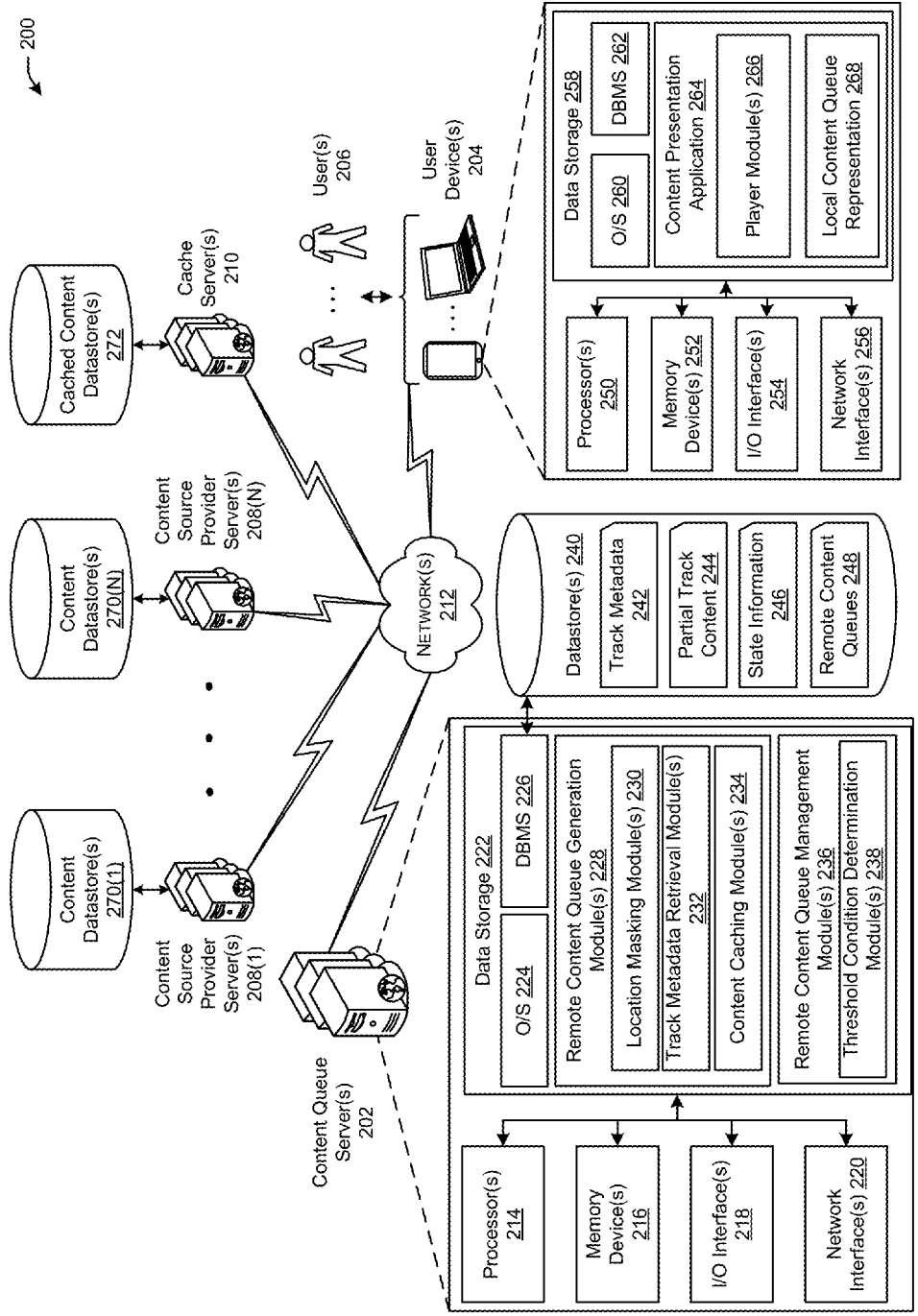
FIG. 2 is a schematic block diagram depicting various illustrative hardware and software components of the system architecture of FIG. 1 in accordance with one or more example embodiments of the disclosure.

FIG. 2 is a schematic block diagram depicting various illustrative hardware and software components of the system architecture 100 of FIG. 1 in accordance with one or more example embodiments of the disclosure. The illustrative system architecture 200 depicted in FIG. 2 may correspond to the system architecture 100 depicted in FIG. 1 and may include one or more content queue servers 202, one or more user devices 204 operable by one or more users 206, one or more content source provider servers 208(1)-208(N), and one or more cache servers 210, each of which may be configured to communicate with one or more other components of the architecture 200 via one or more networks 212.

The content queue server(s) 202, the user device(s) 204, the content source provider server(s) 208(1)-208(N), and the cache server(s) 210 may, in various example embodiments, respectively correspond to the content queue server(s) 102, the user device(s) 104, the content source provider server(s) 108(1)-108(N), and the cache server(s) 110 depicted in FIG. 1, and may include any of the representative types of devices described with respect to these corresponding components of the architecture 100. In addition, the network(s) 212 may include any of the types of networks described with respect to network(s) 112 of the architecture 100. While various illustrative components of the system architecture 200 may be described herein in the singular, it should be appreciated that multiple ones of any such components may be provided in various example embodiments of the disclosure. Further, as with the content source provider server(s) 108(1)-108(N), any particular content source provider computer 208(1)-208(N) associated with a particular content source provider may be referred to generically herein as content source provider server 208.

The content queue server 202 may include any suitable combination of hardware, software, or firmware configured to generate and manage remote content presentation queues in accordance with one or more example embodiments of the disclosure. In an illustrative configuration, the content queue server 202 may include one or more processors (processor(s)) 214, one or more memory devices 216 (generically referred to herein as memory 216), one or more input/output ("I/O") interface(s) 218, one or more network interface(s) 220, and data storage 222. These various components will be described in more detail hereinafter.

The memory 216 of the content queue server 202 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 216 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 216 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 222 may include removable storage and/or non-removable storage including, but not limited to, magnetic storage, optical disk storage, and/or tape storage. The data storage 222 may provide non-transient storage of computer-executable instructions and other data. The data storage 222 may include storage that is internal and/or external to the content queue server 202. The memory 216 and the data storage 222, removable and/or non-removable, are examples of computer-readable storage media (CRSM) as that term is used herein.

The data storage 222 may store computer-executable instructions that are loadable into the memory 216 and executable by the processor(s) 214 to cause various operations to be performed. The data storage 222 may additionally store data that may be copied to memory 216 for use by the processor(s) 214 during the execution of the computer-executable instructions. Moreover, output data generated as a result of execution of the computer-executable instructions by the processor(s) 214 may be stored initially in memory 216, and may ultimately be copied to data storage 222 for non-transient storage.

More specifically, the data storage 222 may store one or more operating systems (O/S) 224; one or more database management systems (DBMS) 226; and one or more program modules, applications, or the like such as, for example, one or more remote content queue generation modules 228, one or more remote content queue management modules 236, and so forth. The remote content queue generation module(s) 228 may further include one or more sub-modules such as, for example, one or more location masking modules 230, one or more track metadata retrieval modules 232, and one or more content caching modules 234. The remote content queue management module(s) 236 may further include one or more sub-module(s) such as, for example, one or more threshold condition determination module(s) 238.

The remote content queue generation module(s) 228 may include computer-executable instructions that, responsive to execution by the processor(s) 214, may cause operations to be performed to generate a remote content queue responsive to receipt of a remote content queue generation request from a content presentation application 264 executing on the user device 204. The remote content queue generation module(s) 228 may be configured to generate remote play queues for content that is associated with a single user or aggregate play queues for respective content associated with multiple users such that each user has access to each other user's respective content via the aggregate play queue. The various sub-modules of the remote content queue generation module(s) 228 may perform respective operations in connection with generation of a remote content queue.

For example, the track metadata retrieval module(s) 232 may include computer-executable instructions that, responsive to execution by the processor(s) 214, may cause operations to be performed for identifying a subset of tracks of the remote content queue and requesting metadata associated with the tracks from one or more content source provider servers 208 (or one or more cache servers 210). As part of the initial remote content queue generation, metadata associated with an initial number of tracks of the remote content queue may be requested. As content associated with the remote content queue is presented by the content presentation application 264, and depending on the nature of state information received from the content presentation application 264, computer-executable instructions of the track metadata retrieval module(s) 232 may be executed to request metadata associated with additional tracks. As will be described in more detail hereinafter, the remote content queue management module(s) 236 may include computer-executable instructions for identifying additional tracks for which to request track metadata and may leverage the functionality supported by the track metadata retrieval module(s) 232 to obtain the track metadata associated with additional tracks.

Upon receipt of the track metadata, the metadata may be stored transiently in memory 216 or non-transiently in data storage 222 or as a portion of the track metadata 242 stored in the datastore(s) 240. The track metadata 242 may include metadata for any number of tracks associated with any number of remote content queues. Further, any state information received from the content presentation application 264 may be stored transiently in memory 216 or non-transiently in data storage 222 or as a portion of the state information 246 stored in the datastore(s) 240. The state information 246 may be associated with the presentation of content in accordance with any number of remote content queues by any number of instances of the content presentation application 264 executing on any number of user devices 204. Accordingly, the state information 246 may be thought of as metadata associated with remote play queues.

The content caching module(s) 234 may include computer-executable instructions that, responsive to execution by the processor(s) 214, may cause operations to be performed for caching initial partial content of those tracks for which track metadata has been received. More specifically, computer-executable instructions of the content caching module(s) 234 may be executed to select a URL (potentially among multiple URLs) included in the track metadata for a track that identifies a network resource (e.g., a content source provider server 208 or a cache server 210) storing the track content. Computer-executable instructions of the content caching module(s) 234 may then be executed to submit a request for an initial portion of the track content to the network resource identified by the selected URL. Initial partial track content that is received may be stored as at least a portion of the partial track content 244. The partial track content 244 may include content of tracks associated with any number of remote content queues.

Upon receipt by the content queue server 202, the track metadata and the initial partial track content may be provided to the content presentation application 264 proactively (e.g., prior to presentation of the associated tracks in accordance with the remote content queue) along with an instruction to initiate content presentation in accordance with the remote content queue. In other example embodiments, the track metadata and/or the initial partial track content may be transmitted to the content presentation application 264 responsive to receipt of state information indicative of selection of a track for presentation or automatic initiation of presentation of a track in accordance with the remote content queue. Once generated, the remote content queues 248 may be transiently stored in memory 216 or non-transiently stored in data storage 222 or datastore(s) 240.

The location masking module(s) 230 may include computer-executable instructions that, responsive to execution by the processor(s) 214, may cause additional operations to be performed in connection with generation of a remote content queue. Such additional operations may include, for example, identifying an IP address of the user device 204 on the which the content presentation application 264 is executing and replacing an IP address of the content queue server 202 with the user device's IP address in a request for track metadata submitted to a content source provider server 208 or a cache server 210. This IP address masking gives the appearance to the content source provider server 208 (or the cache server 210) that the request is being received from the user device 204 itself rather than from the content queue server 102 and may help to ensure that relevant content is provided to a user in the example scenario in which location-based content is being requested.

The remote content queue generation module(s) 228 may further include computer-executable instructions to identify which content associated with the remote content queue may include advertisements injected into the content such as, for example, free streamed music content. The remote content queue generation module(s) 228 may then exclude or provide an instruction to the content presentation application 264 to exclude any indication of such ads from a local representation 268 of the remote play queue. In this manner, the ads may be presented to the user, but the user may be unaware of when the ads will be presented.

The remote content queue management module(s) 236 may include computer-executable instructions that, responsive to execution by the processor(s) 214, may cause operations to be performed for managing existing remote play queues. For example, the remote content queue management module(s) 236 may include computer-executable instructions for identifying additional subsets of tracks for which to request track metadata based on state information received from the content presentation application 264.

As previously described, the state information may indicate the a shuffle mode for the play queue has been selected, in which case, computer-executable instructions provided as part of the remote content queue generation module(s) 236 may be executed to cause a subset of additional tracks to be selected in a random manner. The remote content queue management module(s) 236 may then leverage functionality supported by the track metadata retrieval module(s) 232 to generate and transmit one or more requests to one or more content source provider servers 208 (or one or more cache servers 210) for metadata associated with the additional tracks, and may further leverage functionality supported by the content caching module(s) 234 to request initial partial track content of the additional tracks from the appropriate content service provider server(s) 208 (or cache server(s) 210).

As another illustrative example, the state information may indicate that the user has browsed to a particular set of tracks using the local device representation 268 of the remote play queue, in which case, computer-executable instructions provided as part of the remote content queue management module(s) 236 may be executed to leverage functionality supported by the track metadata retrieval module(s) 232 to fetch track metadata associated with the tracks corresponding to the queue position to which the user has browsed, and optionally, to leverage functionality supported by the content caching module(s) 234 to obtain associated initial partial track content.

The threshold condition determination module(s) 238 may include computer-executable instructions that, responsive to execution by the processor(s) 214, may cause operations to be performed for determining when a condition is met for identifying an additional subset of tracks for which to request metadata, and potentially, initial partial track content. As previously described, the threshold condition determination module(s) 238 may utilize any suitable criteria for determining when to fetch metadata for additional tracks. For example, an additional predetermined number of tracks next up for presentation in the queue may be identified and associated track metadata may be requested when any of a variety of threshold conditions are met. A threshold condition may be met when the position in the queue of a track being presented is within a threshold number of tracks from the last track for which track metadata has been received, when the duration of the remaining content to be presented for tracks for which track metadata has been received is within a threshold duration of time, and so forth. Upon a determination by the threshold condition determination module(s) 238 that a threshold condition has been met, the remote content queue management module(s) 236 may identify the subset of additional tracks for which metadata is to be fetched based, for example, on the static ordering of the queue or based on a random selection of tracks from the queue depending on whether the shuffle mode has been selected. The remote content queue management module(s) 236 may then leverage the functionality supported by the track metadata retrieval module(s) 232 and the content caching module(s) 234 to obtain the track metadata and the initial partial content, respectively, for the additional tracks.

The remote content queue management module(s) 236 may further include computer-executable instructions for maintaining multiple remote play queues for a particular user device 204, and upon receiving state information from the content presentation application 264 indicative of which play queue is reflective of the actual state of the content presented on the user device 204, disabling or deleting the additional play queues that are not reflective of the current device state.

In addition, the remote content queue management module(s) 236 may further include computer-executable instructions for modifying an existing remote content queue based on a request from the content presentation application 264 to associate additional or different content with the remote content queue. In certain other example embodiments, a request from the content presentation application 264 to associate additional or different content with a remote content queue may be treated as a request to generate a new remote content queue, in which case, computer-executable instructions provided as part of the remote content queue generation module(s) 228 may be executed to generate the new remote content queue.

In certain example embodiments, the remote content queue management module(s) 236 may include computer-executable instructions for monitoring the number of track skips that occur for a remote content queue. Certain content source providers may impose restrictions on the number of track skips that may occur within a certain period of time (e.g., an hour, a day, etc.). Accordingly, the remote content queue management module(s) 236 may monitor the number of track skips in order to ensure that such restrictions are enforced.

The content queue server 202 may further support additional functionality via one or more additional modules not depicted in FIG. 2. For example, the data storage 222 may store one or more reporting modules that may include computer-executable instructions that, responsive to execution by the processor(s) 214, may cause information to be reported to a content source provider that is indicative of which tracks provided by the content source provider have been played on a user device 204, when the tracks were played, and so forth. The information reported to a content source provider may further indicate whether an ad was played on a user device 204, and may potentially include an identifier associated with the ad and an indication of when the ad was played. The information reported by the reporting module(s) may be tracked by the reporting module(s) or by other modules of the content queue server 202 (e.g., the remote content queue management module(s) 236).

Referring now to other illustrative components of the content queue server 202, the O/S 224 may be loaded into the memory 216 and may provide an interface between other application software executing on the content queue server 202 and hardware resources of content queue server 202. More specifically, the O/S 224 may include a set of computer-executable instructions for managing hardware resources of the content queue server 202 and for providing common services to other application programs (e.g., managing memory allocation among various application programs). The O/S 224 may include any operating system now known or which may be developed in the future including, but not limited to, any server operating system, any mainframe operating system, or any other proprietary or non-proprietary operating system.

The DBMS 226 may be loaded into the memory 216 and may support functionality for accessing, retrieving, storing, and/or manipulating data stored in one or more of the datastore(s) 240, data stored in the memory 216, and/or data stored in the data storage 222. The DBMS 226 may use any of a variety of database models (e.g., relational model, object model, etc.) and may support any of a variety of query languages. The datastore(s) 240 may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) 240 may represent data in one or more data schemas.

The processor(s) 214 may be configured to access the memory 216 and execute computer-executable instructions stored therein. For example, the processor(s) 214 may be configured to execute computer-executable instructions of the various program modules of the content queue server 202 to cause or facilitate various operations to be performed in accordance with one or more embodiments of the disclosure. The processor(s) 214 may include any suitable processing unit capable of accepting digital data as input, processing the input data in accordance with stored computer-executable instructions, and generating output data. The processor(s) 214 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 214 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 214 may be capable of supporting any of a variety of instruction sets.

The content queue server 202 may further include one or more input/output (I/O) interfaces 218 that may facilitate the receipt of input information by the content queue server 202 from one or more I/O devices as well as the output of information from the content queue server 202 to the one or more I/O devices. The I/O devices may include, for example, one or more user interface devices that facilitate interaction between a user and the content queue server 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The content queue server 202 may be configured to communicate with any of a variety of other systems, platforms, networks, devices, and so forth (e.g., a content source provider server 208, a content cache server 210, a user device 204, etc.) via one or more of the network(s) 212. The content queue server 202 may include one or more network interfaces 220 that may facilitate communication between the content queue server 202 and any of the systems, networks, platforms, devices, or components of the system architecture 200.

Referring now to other illustrative components of the architecture 200, the user device 204 may include any suitable combination of hardware, software, or firmware configured to, among other things, retrieve and present content in accordance with remote content presentation queues. In an illustrative configuration, the user device 204 may include one or more processors (processor(s)) 250, one or more memory devices 252 (generically referred to herein as memory 252), one or more input/output ("I/O") interface(s) 254, one or more network interface(s) 256, and data storage 258. These various components will be described in more detail hereinafter.

The memory 252 of the user device 204 may include any of the types or forms of memory described with respect to the memory 216 of the content queue server 202. Similarly, the data storage 258 may include any of the types or forms of data storage described with respect to the data storage 222 of the content queue server 202. The data storage 258 may provide non-transient storage of computer-executable instructions and other data. The data storage 258 may include storage that is internal and/or external to the user device 204. The memory 252 and the data storage 258, removable and/or non-removable, are examples of computer-readable storage media (CRSM) as that term is used herein.

The data storage 258 may store computer-executable instructions that are loadable into the memory 252 and executable by the processor(s) 250 to cause various operations to be performed. The data storage 258 may additionally store data that may be copied to memory 252 for use by the processor(s) 250 during the execution of the computer-executable instructions. Moreover, output data generated as a result of execution of the computer-executable instructions by the processor(s) 250 may be stored initially in memory 252, and may ultimately be copied to data storage 258 for non-transient storage. More specifically, the data storage 258 may store one or more operating systems (O/S) 260; one or more database management systems (DBMS) 262; and one or more program modules, applications, or the like such as, for example, the content presentation application 264.

The content presentation application 264 may include computer-executable instructions that, responsive to execution by the processor(s) 250, may cause various operations to be performed such as, for example, identifying content or content sources to associate with a remote content queue; generating and transmitting a request to the content queue server 202 to generate the remote content queue; receiving track metadata and initial partial content from the content queue server 202; initiating content presentation in accordance with the remote content queue including presenting the initial partial content of a track and selecting and utilizing a URL included in the associated track metadata to request the track content from a content source provider server 208 or a cache server 210 identified by the URL; selecting and utilizing a URL included in the associated track metadata to request other track metadata (e.g., album images) from a content source provider server 208 or a cache server 210; maintaining and transmitting state information to the content queue server 202 including, for example, an indication that a shuffle mode has been selected, an indication that the user has browsed to a particular position in the local representation 268 of the remote content queue, an indication that presentation of a particular track has been initiated, or the like; and so forth.

The content presentation application 264 may include one or more player modules 266 configured to present content to a user. The content may be presented in accordance with an associated remote content queue. The player module(s) 266 may include computer-executable instructions for generating and presenting a user interface to a user that may include any number of controls for manipulating the content presentation. The controls may include, for example, controls for rewinding, fast-forwarding, pausing, stopping, initiating, traversing between tracks, or adjusting other attributes (e.g., volume, bass, treble, etc.) of the content presentation. The controls may further include a control for repeating playback of a track that is currently playing, a control for selecting a shuffle mode, and so forth. As previously noted, the content presentation application 264 may further include the local representation 268 of the remote play queue 268. The local representation 268 may indicate to the user the content and associated ordering of the content within the queue. The local representation 268 may include identifying information for all tracks in the queue, thereby providing the impression to the user that the entire content queue is stored remotely at the content queue server 202, when in actuality, as discussed previously, the content queue server 202 may store track metadata, and potentially, initial track content for only a subset of the total tracks in the queue.

As part of initiating presentation of a track in accordance with a remote play queue, the content presentation application 264 may first present the initial partial track content received from the content queue server 202. The content presentation application 264 may also select and utilize URLs included in the track metadata associated with the track to retrieve the track content and other track metadata from one or more content source provider servers 208 or one or more cache servers 210. Each set of one or more content source provider servers 208(1)-208(N) may be configured to access a respective set of one or more datastores 270(1)-270(N) to retrieve the requested content and provide it to the content presentation application 264. In certain example embodiments, the request from the content presentation application 264 may be redirected from a content source provider server 208 to a cache server 210 (or a URL may point directly to a cache server 210). In such embodiments, the cache server 210 may access one or more cached content datastore(s) 272 to retrieve the requested content and provide it to the content presentation application 264.

Referring now to other illustrative components of the user device 204, the O/S 260 may be loaded from the data storage 258 into the memory 252 and may provide an interface between other application software executing on the user device 204 and hardware resources of user device 204. More specifically, the O/S 260 may include a set of computer-executable instructions for managing hardware resources of the user device 204 and for providing common services to other application programs (e.g., managing memory allocation among various application programs). The O/S 260 may include any operating system now known or which may be developed in the future including, but not limited to, any desktop operating system, any mobile operating system, or any other proprietary or non-proprietary operating system.

The DBMS 262 may be also be loaded from the data storage 258 into the memory 252 and may support functionality for accessing, retrieving, storing, and/or manipulating data stored in one or more external datastores (not shown), data stored in the memory 252, and/or data stored in the data storage 258. The DBMS 262 may use any of a variety of database models (e.g., relational model, object model, etc.) and may support any of a variety of query languages. The external datastore(s) (not shown) may represent data in one or more data schemas and may include any suitable data repository including, but not limited to, databases (e.g., relational, object-oriented, etc.), file systems, flat files, distributed datastores in which data is stored on more than one node of a computer network, peer-to-peer network datastores, or the like.

The processor(s) 250 may be configured to access the memory 252 and execute computer-executable instructions stored therein. For example, the processor(s) 250 may be configured to execute computer-executable instructions of the various applications and program modules of the user device 204 to cause or facilitate various operations to be performed in accordance with one or more embodiments of the disclosure. The processor(s) 250 may include any suitable processing unit capable of accepting digital data as input, processing the input data in accordance with stored computer-executable instructions, and generating output data. The processor(s) 250 may include any of the types of processing units and any of the types of constituent components described with respect to the processor(s) 214 of the content queue server 202. Further, the microarchitecture design of the processor(s) 250 may be capable of supporting any of a variety of instruction sets.

The user device 204 may further include one or more input/output (I/O) interfaces 254 that may facilitate the receipt of input information by the user device 204 from one or more I/O devices as well as the output of information from the user device 204 to the one or more I/O devices. The I/O devices may include, for example, one or more user interface devices that facilitate interaction between a user and the user device 204 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The user device 204 may be configured to communicate with any of a variety of other systems, platforms, networks, devices, and so forth (e.g., a content source provider server 208, a cache server 210, the content queue server 202, etc.) via one or more of the network(s) 212. The user device 204 may include one or more network interfaces 256 that may facilitate communication between the user device 204 and any of the systems, networks, platforms, devices, or components of the system architecture 200.

It should be appreciated that the program modules or applications depicted in FIG. 2 as being stored in the data storage 222 or the data storage 258 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the content queue server 202 or the user device 204 and/or hosted on other computing device(s) accessible by the content queue server 202 or the user device 204 via one or more of the network(s) 212 may be provided to support functionality provided by the program modules depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the system architecture 200 in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the content queue server 202, the user device 204, or any other illustrative component of the system architecture 200 may include alternate and/or additional hardware, software, or firmware components beyond those described or depicted without departing from the scope of the disclosure. More particularly, it should be appreciated that software, firmware, or hardware components depicted as forming part of the content queue server 202 or the user device 204 are merely illustrative and that some components may not be present or additional components may be provided in various embodiments. While various illustrative program modules have been depicted as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Data Flows and Illustrative Processes

Figure 3:
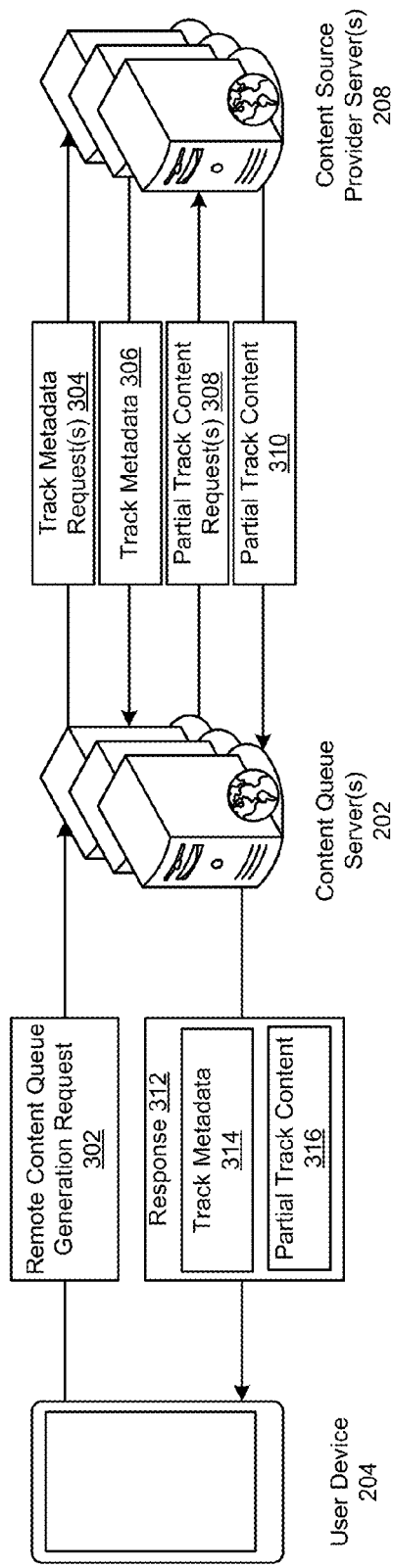
FIG. 3 is a hybrid system and data flow diagram depicting illustrative data communications in connection with a remote content presentation queue generation request in accordance with one or more example embodiments of the disclosure.

FIG. 3 is a hybrid system and data flow diagram depicting illustrative data communications in connection with a remote content presentation queue generation request in accordance with one or more example embodiments of the disclosure. FIG. 3 will be described hereinafter in conjunction with FIG. 5, which is a process flow diagram of an illustrative method 500 for generating a remote content presentation queue in accordance with one or more example embodiments of the disclosure.

One or more operations of the method 500 may be described as being performed by a content queue server 202, or more specifically, by one or more program modules executing on the content queue server 202. It should be appreciated, however, that any of the operations of the method 500 may be performed by another device or component of the system architecture 200. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the method 500 are described in the context of the illustrative system architecture 200, it should be appreciated that the method may be implemented in connection with numerous other architectural and device level configurations.

Figure 5:
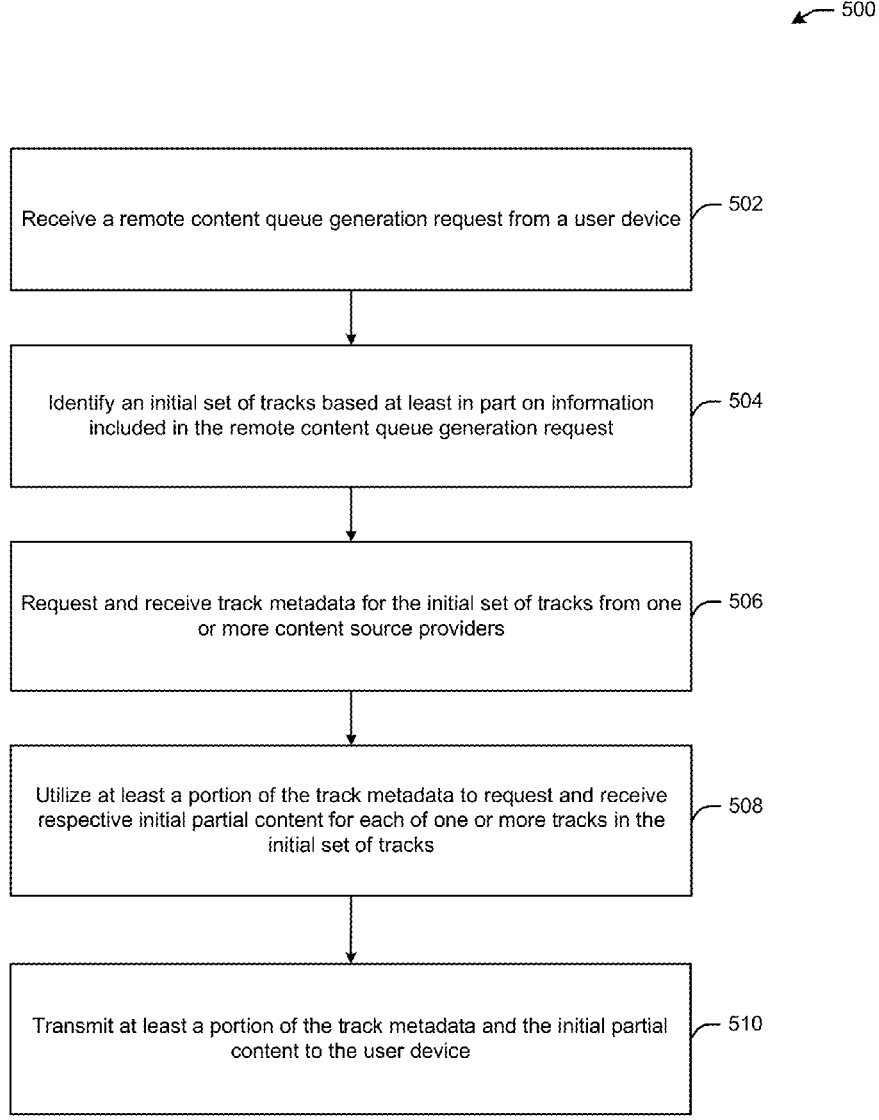
FIG. 5 is a process flow diagram of an illustrative method for generating a remote content presentation queue in accordance with one or more example embodiments of the disclosure.

Referring to FIGS. 3 and 5 in conjunction with each other, at block 502, the content queue server 202 may receive a remote content queue generation request 302 from a user device 204, or more specifically, from a content presentation application 264 executing on the user device 204. The remote content queue generation request 302 may include information that identifies content or source(s) of content to be associated with a remote content queue.

At block 504, computer-executable instructions provided as part of the remote content queue generation module(s) 228 of the content queue server 202 may be executed to identify a set of tracks based at least in part on information included in the remote content queue generation request. For example, in certain example embodiments, the request may include an indication of the tracks to associate with the remote content queue and an associated ordering of the tracks for the queue. In such embodiments, the remote content generation module(s) 228 may identify a predetermined number of initial tracks based on the specified ordering. In other example embodiments, the request may specify a content streaming provider as a source for the content to associate with the queue. In such embodiments, the content queue server 202 may transmit a request to the content streaming provider for information identifying a predetermined number of initial tracks. In certain example embodiments, computer-executable instructions provided as part of the location masking module(s) 230 may be executed to include an IP address of the user device 202 in the request instead of an IP address of the content queue server 202 in order to give the impression to the content streaming provider that the request was transmitted by the user device 204 itself. This may occur in scenarios in which the content is determined based on attributes associated with the user device 204 or a user of the user device 204 such as a geographical location of the user device 204.

At block 506, computer-executable instructions provided as part of the track metadata retrieval module(s) 232 may be executed to generate and transmit one or more requests for metadata associated with the initial set of tracks to one or more content source provider servers 208 (or one or more cache servers 210). The track metadata 306 received at block 506 may include a respective track identifier and a respective set of URLs indicative of resources storing the track content or other track metadata associated with the track for each track in the initial set of tracks. The track metadata 306 may optionally include additional metadata associated with the initial set of tracks such as genre information, album/artist information, and so forth.

At block 508, computer-executable instructions provided as part of the content caching module(s) 234 may be executed to identify, for each of one or more of the initial set of tracks, a respective URL included in the respective metadata received for the track (potentially among multiple URLs), and to transmit a request 308 for initial partial content of the track to a content source provider server 208 (or cache server 210) identified by the respective URL. The initial partial track content 310 received by the content queue server 202 at block 508 may include respective initial partial track content for each of one or more tracks of the initial set of tracks. It should be appreciated that, in various example embodiments, the content source provider server 208 may source the initial partial track content itself or redirect the request to a cache server 210 configured to provide the initial partial track content. In other example embodiments, the URL that is utilized may point to a cache server 210.

At block 510, the content queue server 202 may transmit a response 312 to the user device 204 (or more specifically the content presentation application 264) that may include at least a portion 314 of the track metadata 306 and at least a portion 316 of the initial partial track content 310 along with an instruction to initiate content presentation in accordance with the generated remote content queue. In other example embodiments, the content queue server 202 may transmit the track metadata 314 and the initial partial track content 316 on an as-needed basis responsive to state information received from the content presentation application 264 indicating that presentation of track has been initiated.

Figure 4:
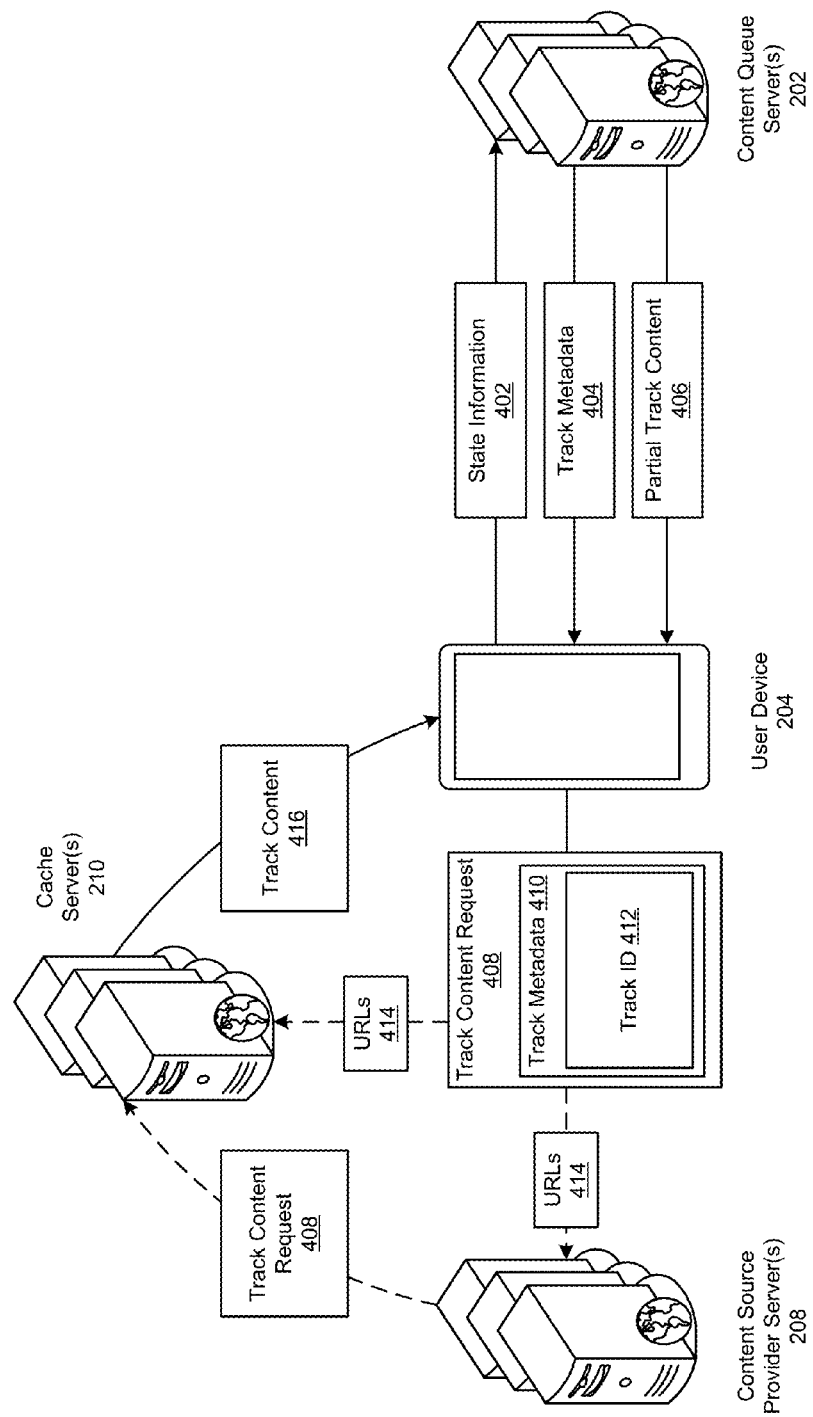
FIG. 4 is a hybrid system and data flow diagram depicting illustrative data communications in connection with presentation of content associated with a remote content presentation queue on a user device in accordance with one or more example embodiments of the disclosure.
Figure 6:
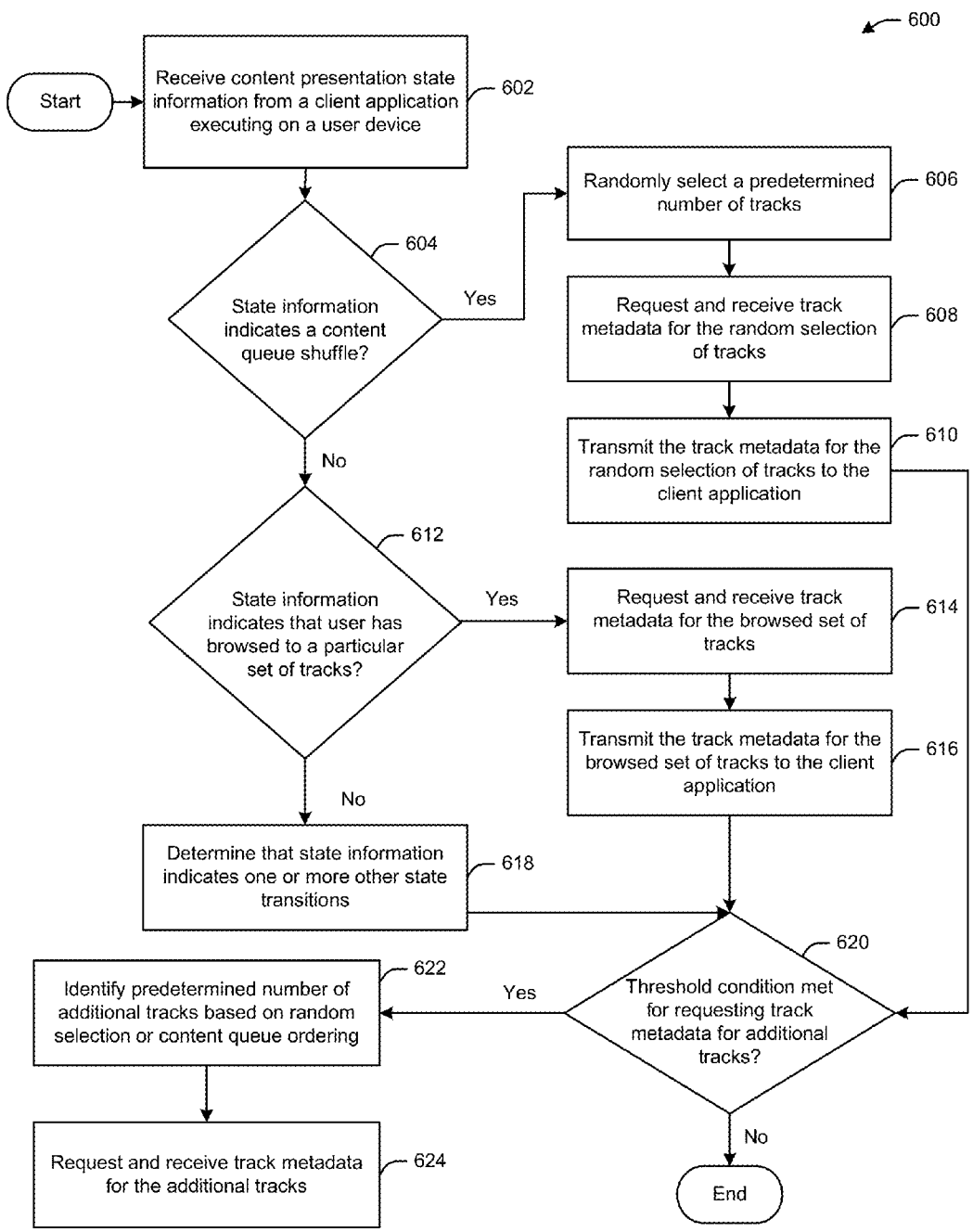
FIG. 6 is a process flow diagram of an illustrative method for identifying, based on content presentation state information, a set of tracks for which to request associated metadata in accordance with one or more example embodiments of the disclosure.
Figure 7:
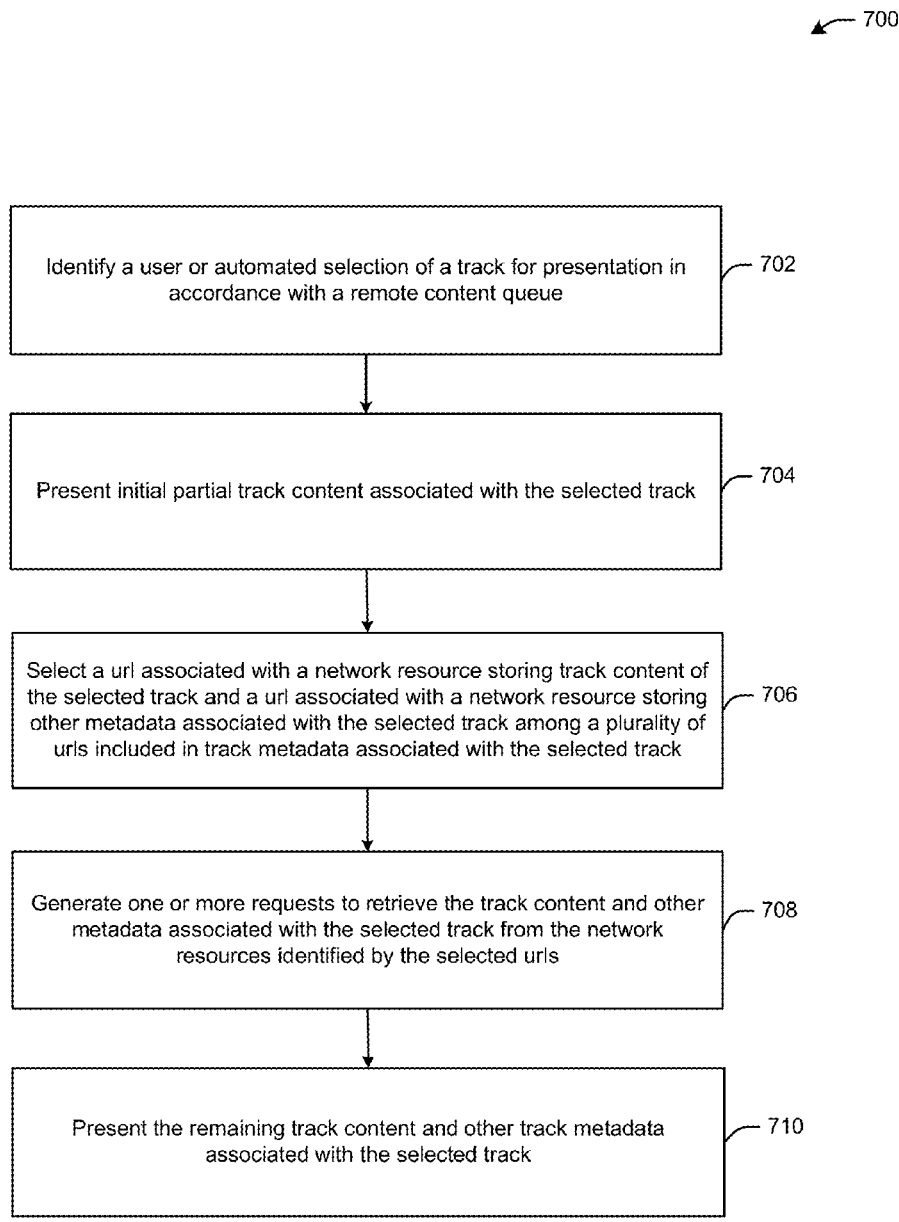
FIG. 7 is a process flow diagram of an illustrative method for initiating presentation on a user device of content associated with a remote content presentation queue in accordance with one or more example embodiments of the disclosure.

FIG. 4 is a hybrid system and data flow diagram depicting illustrative data communications in connection with presentation of content associated with a remote content presentation queue on a user device in accordance with one or more example embodiments of the disclosure. FIG. 4 will be described hereinafter in conjunction with FIGS. 6 and 7. FIG. 6 is a process flow diagram of an illustrative method 600 for identifying a set of tracks for which to request associated metadata based on content presentation state information in accordance with one or more example embodiments of the disclosure. FIG. 7 is a process flow diagram of an illustrative method 700 for initiating presentation on a user device of content associated with a remote content presentation queue in accordance with one or more example embodiments of the disclosure.

One or more operations of the method 600 may be described as being performed by a content queue server 202, or more specifically, by one or more program modules executing on the content queue server 202. Similarly, one or more operations of the method 700 may be described as being performed by the user device 204, or more specifically, by one or more applications, program modules, or the like executing on the user device 204 (e.g., the content presentation application 264). It should be appreciated, however, that any of the operations of the methods 600 and 700 may be performed by another device or component of the system architecture 200. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the methods 600 and 700 are described in the context of the illustrative system architecture 200, it should be appreciated that the method may be implemented in connection with numerous other architectural and device level configurations.

Referring to FIGS. 4 and 6 in conjunction with each other, at block 602, the content queue server 202 may receive content presentation state information 402 from a user device 204, or more specifically, from a content presentation application 264 executing on the user device 204.

At block 604, computer-executable instructions provided as part of the remote content queue management module(s) 236 may be executed to determine whether the received state information 402 indicates that a shuffle mode has been selected for the content queue. The state information 402 may include a flag, identifier, or other indicator based on which a determination may be made as to whether the shuffle mode has been selected.

If it is determined at block 604 that the state information 402 does indicate that a queue shuffle has been selected, at block 606, computer-executable instructions provided as part of the remote content queue management module(s) 236 may be executed to randomly select a predetermined number of tracks associated with the remote content queue. The tracks may be selected based, for example, on output generated by a random number generator.

At block 608, computer-executable instructions provided as part of the track metadata retrieval module(s) 232 may be executed to request and receive track metadata for the random selection of tracks. The track metadata may be received from one or more content source provider servers 208 or from one or more cache servers 210.

At block 610, the content queue server 202 may transmit at least a portion 404 of received track metadata to the user device 204, or more specifically, to the content presentation application 264 executing on the user device 204. Although not depicted as part of the illustrative method 600, it should be appreciated that the content queue server 202 may also request and receive initial partial track content for the random selection of tracks and transmit at least a portion 406 thereof to the content presentation application 264. Further, the content queue server 202 may continue to identify additional tracks and request associated metadata in accordance with operations 606-610 until additional state information is received indicating that the shuffle mode has been de-selected. It should further be appreciated that, in certain example embodiments, the content queue server 202 may perform operations 606-610 upon first receiving an indication that a state transition to the shuffle mode has occurred. In those example embodiments in which state information that is subsequently received continues to indicate that the queue is in shuffle mode, operations 606-610 may be bypassed, and the method 600 may proceed to block 622.

Referring again to the determination at block 604, if it is determined that the state information 402 does not indicate selection of a shuffle mode for the remote play queue, the method 600 may proceed to block 612 where a determination may be made as to whether the received state information 402 indicates that the user has browsed to a particular portion of a local representation 268 of the remote content queue (e.g., a particular set of tracks in the queue).

If it is determined that the user has browsed to a particular set of tracks, at block 614, the content queue server 202 may request and receive track metadata for the browsed set of tracks from one or more content source provider servers 208 or one or more cache servers 210. As previously described, the content queue server 202 may have fetched and stored, at any given point in time, track metadata for only a subset of the total number of tracks in a remote play queue. Accordingly, if the user has browsed to a portion of the queue (e.g., tracks 290-300) that is sufficiently far removed from the current position of the queue, the content queue server 202 has likely not yet fetched track metadata associated with the portion of the queue to which the user has browsed.

At block 616, the content queue server 202 may transmit at least a portion 404 of received track metadata to the user device 204, or more specifically, to the content presentation application 264 executing on the user device 204. Although not depicted as part of the illustrative method 600, it should be appreciated that the content queue server 202 may also request and receive initial partial track content for the browsed set of tracks and transmit at least a portion 406 thereof to the content presentation application 264.

Referring again to the determination at block 612, if it is determined that the state information 402 does not indicate that the user has browsed to a particular portion of the queue, the method 600 may proceed to block 618 where the content queue server 202 may determine that the received state information 402 indicates one or more other state transitions with respect to the remote play queue. Such state transition(s) may include any of those previously described such as, for example, user selection of a "next" or "previous" button provided via a user interface of the content presentation application 268 to advance to a next track in the queue or a previous track in the queue; selection of a "loop" mode according to which playback of the tracks of the queue are repeated in accordance with the queue order (e.g., playback of the first track in the queue begins subsequent to completion of playback of the last track in the queue); selection of a "repeat" mode according to which playback of a particular track is repeated until the "repeat" mode is disabled; and so forth. It should be appreciated that the above examples of state transitions that may be indicated by the state information 402 are merely illustrative and not exhaustive.

Responsive to determining that the state information 402 indicates one or more other state transitions at block 618, responsive to operations 606-610 (performed upon determining that the state information 402 indicates that a shuffle mode has been selected), or responsive to operations 614-616 (performed upon determining that the state information 402 indicates that the user has browsed to a particular set of tracks), the method 600 may proceed to block 620 where computer-executable instructions provided as part of the threshold condition determination module(s) 238 may be executed to determine whether a threshold condition is met for requesting track metadata for an additional subset of tracks. The threshold condition may correspond to any of those previously described such as, for example, that a number of tracks yet to be played and for which track metadata has been received is at or below a corresponding threshold value, that the duration of the track(s) that remain to be played and for which track metadata has been received is at or below a threshold value, and so forth. While the determination at block 620 is described as being made subsequent to receipt and analysis of the state information 402, it should be appreciated that the determination at block 620 may be made even in the absence of the receipt of any state information. That is, the determination at block 620 may be made periodically as content is presented by the content presentation application 264 in accordance with the remote content queue.

If it is determined at block 620, that a threshold condition has not been met, the method 600 may end, and the content presentation application 264 may continue presenting content in accordance with the remote play queue. The method 600 may again be performed responsive to receipt of additional state information from the content presentation application 264. In addition, the determination at block 620 may be performed periodically even in the absence of state information.

If, on the other hand, it is determined at block 620 that a threshold condition is met, the method 600 may proceed to block 622 where computer-executable instructions provided as part of the remote content queue management module(s) 236 may be executed to identify a predetermined number of additional tracks based on random selection (if the queue is in shuffle mode) or based on an ordering of the remote content queue.

At block 624, computer-executable instructions provided as part of the track metadata retrieval module(s) 232 may be executed to request and receive track metadata for the additional tracks. The track metadata may be received from one or more content source provider servers 208 or from one or more cache servers 210. Although not depicted in FIG. 6, at least a portion 404 of the track metadata that is received at block 624 may be transmitted to the content presentation application 264. Further, although not depicted as part of the illustrative method 600, it should be appreciated that the content queue server 202 may also request and receive initial partial track content for the additional tracks and transmit at least a portion 406 thereof to the content presentation application 264.

Referring now to FIGS. 4 and 7 in conjunction with each other, at block 702, the content presentation application 264 executing on the user device 204 may identify a user or automated selection of a track for presentation in accordance with a remote content queue.

At block 704, the content presentation application 264 may identify initial partial content associated with the selected track from the initial partial content 406 received from the content queue server 202 and present the identified initial partial content via the player module(s) 266.

At block 706, the content presentation application 264 may identify track metadata associated with the selected track. The track metadata may have been received from the content queue server 202 prior to or responsive to selection of the track for presentation. As previously described, the track metadata may include an identifier associated with the selected track as well as multiple URLs that point to network resources storing the track content and multiple URLs that point to network resources storing additional track metadata such as images, graphics, or the like.

Each URL that points to a network resource storing content of the selected track may be associated with a particular content quality (e.g., high definition, standard definition, etc.); a particular content streaming quality (e.g. streaming bit rate); a particular container or wrapper format (e.g., a Moving Picture Experts Group (MPEG) format such as MPEG-1 or MPEG-2 Audio Layer III, MPEG-4 Part 14, etc.); and so forth. Similarly, each URL that points to a network resource storing other track metadata associated with the selected track may be associated with a particular quality; file format (e.g., image file formats such as the Joint Photographic Experts Group (JPEG) format, Graphics Interchange Format (GIF), or the like); image size; and so forth.

Accordingly, at block 706, the content presentation application 264 may execute one or more algorithms to select a particular URL for retrieving the content of the selected track, and optionally, a particular URL for retrieving the other track metadata. The URLs may be selected based on any of variety of inputs such as, for example, characteristics of a network connection of a user device on which the content presentation application 264 is executing (e.g., downstream transfer speed), device characteristics of the user device (e.g., form factor, processing capabilities, display capabilities, etc.), and so forth.

At block 708, the content presentation application 264 may generate a request (e.g., track content request 408) for retrieving the track content associated with the selected track and may direct the request to a network resource identified by a URL 414 selected at block 706. Optionally, the content presentation application 264 may further generate a request for retrieving other track metadata associated with the selected track and may direct the request to a network resource identified by a URL 414 selected at block 706. The request(s) generated by the content presentation application 264 may include at least a portion of the track metadata 410 associated with the selected track such as, for example, an identifier 412 associated with the selected track. The track metadata 410 associated with the selected track may be identified from the track metadata 404 received from the content queue server 202.

In certain example embodiments, the content presentation application 264 may transmit the track content request 408 to a content source provider server 208. That is, the URL 414 for retrieving the track content for the selected track may point to a content source provider server 208. Upon receipt of the request 408, in certain example embodiments, the content source provider server 208 may redirect the request 408 to a cache server 210 which may, in turn, retrieve and transmit the track content 416 to the user device 204. In other example embodiments, the user device 204 may source the track content 416 directly from the content source provider server 208. In still other example embodiments, the URL 414 for retrieving the track content for the selected track may point to a cache server 210, in which case, the content presentation application 264 may transmit the track content request 408 to the cache server 210 without first transmitting the track content request 408 to a content source provider server 208. A request for additional track metadata associated with the selected track (e.g., graphics, images, text, etc.) may similarly be transmitted to the content source provider server 208 which may, in turn, provide the requested metadata to the content presentation application 264 itself or redirect the request to a cache server 210. Alternatively, the request for additional track metadata may be transmitted directly to the cache server 210.

At block 710, the content presentation application 264 may receive the track content 416 from the content source provider server 208 or the cache server 210 and present the track content 416 via the player module(s) 266. The received track content 416 may be the remaining track content (e.g., track content that excludes the initial partial content being presented) or the complete track content. As such, the content presentation application 264 may be configured to seamlessly integrate the track content 416 with the initial partial content already being presented so as not to disrupt the user experience.

As previously noted, the content presentation application 264 may a select a particular URL that points to a network resource storing additional track metadata associated with the selected track from among one or more URLs included in track metadata received from the content queue server 202. Such additional track metadata (e.g., album images, graphics, text, etc.) may be presented in conjunction with the playable content. In certain example embodiments, the content queue server 202 may perform an image scaling operation on an image URL for retrieving such additional track metadata prior to transmitting the image URL as part of the track metadata transmitted to the content presentation application 264. The image scaling operation may be based on the type of user device 204 on which the content presentation application 264 is executing, and the content queue server 202 may provide the modified image URL to the content presentation application 264 so that an image or the like associated with the image URL is suited for display on the user device 204. In this manner, the need for the user device 204 to perform such operations is obviated, and latency associated with presenting content to the user is reduced.

Figure 8:
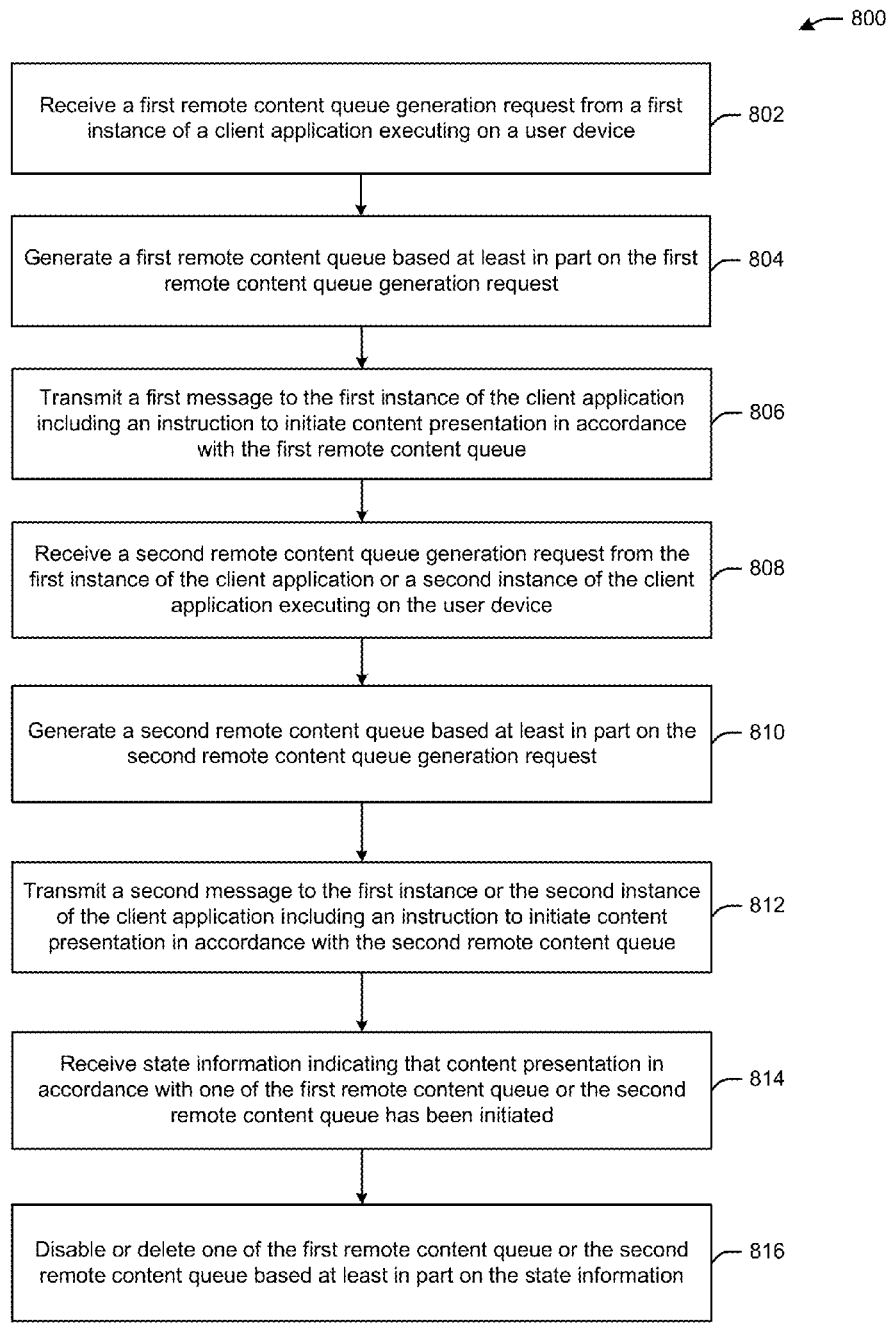
FIG. 8 is a process flow diagram of an illustrative method for generating multiple remote content presentation queues for a user device in accordance with one or more example embodiments of the disclosure.

FIG. 8 is a process flow diagram of an illustrative method 800 for generating multiple remote content presentation queues for a user device in accordance with one or more example embodiments of the disclosure.

One or more operations of the method 800 may be described as being performed by a content queue server 202, or more specifically, by one or more program modules executing on the content queue server 202. It should be appreciated, however, that any of the operations of the method 800 may be performed by another device or component of the system architecture 200. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the method 800 are described in the context of the illustrative system architecture 200, it should be appreciated that the method may be implemented in connection with numerous other architectural and device level configurations.

At block 802, the content queue server 202 may receive a first remote content queue generation request from a first instance of the content presentation application 264 executing on a user device 204.

At block 804, computer-executable instructions provided as part of the remote content queue generation module(s) 228 may be executed to generate a first remote content queue based at least in part on the first remote content queue generation request.

At block 806, the content queue server 202 may transmit a first message to the first instance of the content presentation application 264 including an instruction to initiate content presentation in accordance with the first remote content queue.

At block 808, the content queue server 202 may receive a second remote content queue generation request from the first instance of the content presentation application 264 or from a second instance of the content presentation application 264. For example, a second instance of the content presentation application 264 may have been launched on the user device 204 by the same user or a different user (e.g., the content presentation application 264 may have been launched in a second browser window or tab). As another non-limiting example, a user may wish to add or delete content from the queue, in which case, the first instance of the content presentation application 264 may have generated the second request.

At block 810, computer-executable instructions provided as part of the remote content queue generation module(s) 228 may be executed to generate a second remote content queue based at least in part on the second content queue generation request.

At block 812, the content queue server 202 may transmit a second message to the instance of the content presentation application 264 from which the second request was received (e.g., either the first or second instance). The second message may include an instruction to initiate content presentation in accordance with the second remote content queue. Despite generating the second remote content queue, the content queue server 202 may nonetheless maintain the first remote content queue for a variety of reasons. For example, loss of network connectivity for the user device 204 may result in the second message not being delivered to the user device 204. As another non-limiting example, in those example embodiments in which remote content queue generation requests are received from multiple instances of the content presentation application 264 running on the user device 204, the content queue server 202 may not have knowledge as to which remote queue the device has actually begun playing.

At block 814, the content queue server 202 may receive state information from one of the first instance or the second instance of the content presentation application 264 indicating that content presentation in accordance with one of the first remote content queue or the second remote content queue has been initiated on the user device 204.

At this point, the content queue server 202 has knowledge as to which remote content queue is actually being presented on the user device 204, and at block 816, may disable or delete the remote content queue that is not being presented (e.g., one of the first remote content queue or the second remote content queue).

The operations described and depicted in the illustrative methods of FIGS. 5-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 5-8 may be performed. In addition, the data communications depicted in FIGS. 3 and 4 are merely illustrative, and in certain example embodiments, more or less data communications than those depicted may occur. Moreover, the depicted data communications or additional data communications not depicted may occur between different pairs of communicating entities or may involve additional intermediary devices not depicted.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving, from a first application executing on a first user device, by a remote play queue management system comprising one or more servers remote from the first user device, a request to add a plurality of tracks to a remote play queue, wherein the plurality of tracks comprises a first track that corresponds to a first content source provider and a second track that corresponds to a second content source provider;
adding the plurality of tracks to a remote content presentation queue;
receiving, by the remote play queue management system, from the first content source provider, first metadata corresponding to the first track;
receiving, by the remote play queue management system, from the second content source provider, second metadata corresponding to the second track;
receiving, by the remote play queue management system, initial partial content of the first track from the first content source provider or a content delivery network;
receiving, by the remote play queue management system, initial partial content of the second track from the second content source provider or the content delivery network;

storing the first and second metadata in association with the remote play queue;

storing, by the remote play queue management system, the initial partial content of the first and second tracks;

transmitting, by the remote play queue management system, to a second application executing on a second user device, a message comprising the first and second metadata; and transmitting, by the remote play queue management system, the initial partial content of the first and second tracks to the second application executing on the second user device.

2. The method of claim 1, wherein the first metadata comprises a first plurality of resource identifiers associated with the first track and the second metadata comprises a second plurality of resource identifiers associated with the second track, wherein each resource identifier identifies a respective network resource storing content of the first track, content of the second track, other metadata associated with the first track, or other metadata associated with the second track.

3. The method of claim 2, wherein the first plurality of resource identifiers comprises a first resource identifier associated with a first streaming quality of the content of the first track and a second resource identifier associated with a second streaming quality of the content of the first track.

4. The method of claim 1, wherein the request to add the plurality of tracks to the remote play queue further comprises information specifying a respective position of each of the plurality of tracks in the remote play queue.

5. The method of claim 1, further comprising:
receiving, by the remote play queue management system, an initial portion of track content for the first track from a network resource storing the track content using, at least in part, a resource identifier included in the first metadata that identifies the network resource.

6. A system, comprising:
at least one memory storing computer-executable instructions; and
at least one processor configured to access the at least one memory and execute the computer-executable instructions to:
receive, from an application executing on a user device, a request to add a plurality of tracks to a remote content presentation queue, wherein the plurality of tracks comprises a first track that corresponds to a first content source provider and a second track that corresponds to a second content source provider;
add the plurality of tracks to the remote content presentation queue;
receive first metadata corresponding to the first track from the first content source provider;
receive second metadata corresponding to the second track from the second content source provider;
receive, initial partial content of the first track from the first content source provider or a content delivery network;
receive, initial partial content of the second track from the second content source provider or the content delivery network;
store the first and second metadata in association with the remote content presentation queue;
store the initial partial content of the first track and the initial partial content of the second track;
transmit a message to the application comprising the first and second metadata; and
transmit the initial partial content of the first track and the initial partial content of the second track to the user device.

7. The system of claim 6, wherein the at least one processor is further configured to execute the computer-executable instructions to identify a respective position of each of the plurality of tracks in the remote content presentation queue based at least in part on information included in the request to add the plurality of tracks to the remote content presentation queue.

8. The system of claim 7, wherein the at least one processor is further configured to execute the computer-executable instructions to:
identify the first track and the second track based at least in part on the respective positions of each of the first track and the second track in the remote content presentation queue and a position of a track currently being presented by the application.

9. The system of claim 6, wherein a total number of tracks associated with the remote content presentation queue is greater than a number of tracks for which metadata has been received.

10. The system of claim 6, wherein the at least one processor is further configured to execute the computer-executable instructions to:
identify the first and second content source providers based at least in part on first and second content source provider identifiers, respectively, wherein the first and second content source provider identifiers are specified in the request to add the plurality of tracks to the remote content presentation queue.

11. The system of claim 6, wherein the at least one processor is further configured to execute the computer-executable instructions to:
determine that a threshold condition is satisfied in connection with presentation of a first subset of the plurality of tracks by the content presentation application, wherein the first subset comprises the first track and the second track;
identify a second subset of the plurality of tracks;
receive, from one or more content source providers, respective metadata associated with each track in the second subset;
store the respective metadata; and
transmit a message to the application comprising the respective metadata.

12. The system of claim 11, wherein the threshold condition comprises one of:
i) a number of one or more tracks of the first subset that have not been presented by the application is at or below a first threshold value, or
ii) an amount of content associated with the first subset that remains to be presented by the application is at or below a second threshold value.

13. The system of claim 6, wherein the at least one processor is configured to receive the first metadata by executing the computer-executable instructions to transmit a metadata request to the first content source provider that comprises an Internet Protocol (IP) address associated with the user device.

14. The system of claim 6, wherein the at least one processor is further configured to execute the computer-executable instructions to:
receive state information from the application;
determine that the state information comprises an indication that an instruction to shuffle the remote content presentation queue has been received;

identify a random selection of tracks associated with the remote content presentation queue;

obtain, from one or more content source providers, respective metadata associated with one or more tracks in the random selection of tracks;

store the respective metadata; and transmit a message to the application comprising the respective metadata.

15. The system of claim 6, wherein the at least one processor is further configured to execute the computer-executable instructions to:

receive state information from the application;

determine that the state information comprises an indication that a user of the user device is browsing a particular range of queue positions of the remote content presentation queue;

identify a set of tracks corresponding to the range of queue positions;

receive, from one or more content source providers, respective metadata associated with one or more tracks of the set of tracks corresponding to the range of queue positions;

store the respective metadata; and transmit a message to the application comprising the respective metadata.

16. The system of claim 6, wherein the at least one processor is further configured to execute the computer-executable instructions to:

receive state information from the application;

determine that the state information indicates one or more state transitions associated with the remote content presentation queue; and responsive to the determination that the state information indicates the one or more state transitions, determine whether a threshold condition is satisfied for requesting respective metadata associated with one or more additional tracks associated with the remote content presentation queue.

17. The system of claim 16, wherein the one or more state transitions comprise one of selection of a loop mode, selection of a repeat mode, selection of a next track in the remote content presentation queue, or selection of a previous track in the remote content presentation queue.

18. The system of claim 6, wherein the at least one processor is further configured to execute the computer-executable instructions to:

receive, from the application executing on a user device, a request to add an additional track to a remote content presentation queue, wherein the plurality of tracks is associated with a first user and the additional track is associated with a second user.

19. The system of claim 6, wherein the at least one processor is further configured to execute the computer-executable instructions to:

receive, from a second application executing on a second user device, a request to add a second plurality of tracks to the remote content presentation queue; and add the second plurality of tracks to the remote content presentation queue.

20. The system of claim 6, wherein the message comprising the first and second metadata is transmitted to a second user device.

21. One or more non-transitory computer-readable media storing computer-executable instructions that, responsive to execution by one or more computer processors, causes operations to be performed comprising:

transmitting, to a remote system, a request to add a plurality of tracks to a remote play queue, wherein the plurality of tracks comprises a first track and a second track;

receiving, from the remote system, first metadata associated with the first track, wherein the first metadata comprises a first track identifier;

receiving, from the remote system, second metadata associated with the second track, wherein the second metadata comprises a second track identifier;

receiving, from the remote system, initial partial content of the first track;

receiving, after the receipt of the initial partial content of the first track, a request to present the first track by a user interface component;

transmitting, to the remote system, a request for a remainder of the first track;

sending, to the user interface component, the initial partial content of the first track for presentation;

receiving the remainder of the first track from a first content resource; and playing at least a portion of the remainder of the first track after playing the initial partial content of the first track.

22. The one or more computer-readable media of claim 21, wherein at least one of the first metadata or the second metadata is received based at least in part on a current play state of the remote play queue.

23. The one or more computer-readable media of claim 21, the operations further comprising:

receiving user input indicative of an instruction to shuffle the remote play queue;

transmitting, to the remote system, state information indicative of the instruction to shuffle the remote play queue;

receiving, from the remote system, metadata associated with a set of randomly selected tracks associated with the remote play queue and an indication of an order in which to play the set of randomly selected tracks; and playing the set of randomly selected tracks in accordance with the order.

24. The one or more computer-readable media of claim 21, wherein the request to add the plurality of tracks is received from a first user device and the first and second content are played on a second user device.

25. The one or more computer-readable media of claim 21, further comprising:

receiving, from the remote system, initial partial content of the second track;

receiving, after the receipt of the initial partial content of the second track, a request to present the second track by a user interface component;

transmitting, to the remote system, a request for a remainder of the second track;

sending, to the user interface component, the initial partial content of the second track for presentation;

receiving the remainder of the second track; and playing at least a portion of the remainder of the second track after playing the initial partial content of the second track.

* * * * *